(12) United States Patent
Bertolotti et al.

(10) Patent No.: US 7,530,787 B2
(45) Date of Patent: *May 12, 2009

(54) ROTOR HUB FAIRING SYSTEM FOR A COUNTER-ROTATING, COAXIAL ROTOR SYSTEM

(75) Inventors: Fabio P. Bertolotti, South Windor, CT (US); Mark W. Scott, Bethany, CT (US); Brian E. Wake, South Glastonbury, CT (US); T. Alan Egolf, Glastonbury, CT (US); Duane C. McCormick, Colchester, CT (US); Ebru Usta, Glastonbury, CT (US); Stuart S. Ochs, Manchester, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 427 days.

This patent is subject to a terminal disclaimer.

(21) Appl. No.: 11/436,362

(22) Filed: May 18, 2006

(65) Prior Publication Data

US 2007/0166163 A1 Jul. 19, 2007

Related U.S. Application Data

(63) Continuation-in-part of application No. 11/141,246, filed on May 31, 2005, now Pat. No. 7,229,251.

(51) Int. Cl.
*B64C 27/50* (2006.01)
(52) U.S. Cl. .................. 416/33; 416/124; 416/128; 416/134 A; 416/204 R

(58) Field of Classification Search .................. 416/33, 416/124, 128, 134 A, 204 R; 244/17.23
See application file for complete search history.

(56) References Cited

U.S. PATENT DOCUMENTS

| | | | |
|---|---|---|---|
| 2,323,786 | A | 7/1943 | Beisel |
| 2,328,786 | A | 9/1943 | Crowder |
| 2,397,632 | A | 4/1946 | Stuart |
| 3,149,803 | A | 9/1964 | Petrides et al. |
| 3,894,703 | A | 7/1975 | Velasquez |
| 4,022,546 | A | 5/1977 | Drees et al. |
| 4,053,258 | A | 10/1977 | Mouille |
| 4,123,018 | A | 10/1978 | Tassin de Montaigu |
| 4,212,588 | A | 7/1980 | Fradenburgh |
| 4,478,379 | A | 10/1984 | Kerr |

(Continued)

OTHER PUBLICATIONS

Title: Summary of Rotor Hub Drag Data; By: G.N. Keys and H.J. Rosenstein; Dated: Mar. 1978.

(Continued)

*Primary Examiner*—Igor Kershteyn
(74) *Attorney, Agent, or Firm*—Carlson, Gaskey & Olds PC

(57) ABSTRACT

A rotor hub fairing system includes an upper hub fairing, a lower hub fairing and a shaft fairing therebetween. The rotor hub fairing system reduces the total drag on a dual, counter-rotating, coaxial rotor system. Other aerodynamic structures may be mounted to the shaft fairing, hub fairings and airframe to facilitate flow around the upper and lower hub fairings to reduce flow separation and drag.

23 Claims, 37 Drawing Sheets

U.S. PATENT DOCUMENTS

| | | |
|---|---|---|
| 4,566,856 A | 1/1986 | Miller |
| 4,580,944 A | 4/1986 | Miller |
| 4,809,931 A | 3/1989 | Mouille et al. |
| 5,251,847 A | 10/1993 | Guimbal |
| 5,289,994 A | 3/1994 | Del Campo Aguilera |
| 5,364,230 A | 11/1994 | Krauss et al. |
| 5,415,364 A | 5/1995 | Grant |
| 5,588,618 A | 12/1996 | Marze et al. |
| 5,727,754 A | 3/1998 | Carter, Jr. |
| 5,885,059 A | 3/1999 | Kovalsky et al. |
| 5,954,480 A | 9/1999 | Schmaling et al. |
| 7,083,142 B2 | 8/2006 | Scott |
| 7,229,251 B2 | 6/2007 | Bertolotti et al. |
| 7,270,520 B2 | 9/2007 | Sudre et al. |

OTHER PUBLICATIONS

Title: Experimental Investigation of Advanced Hub and Pylon Fairing Configurations to Reduce Helicopter Drag; By: D.M. Martin, R.W. Mort, L.A. Young, P.K. Squires; Dated: Sep. 1993, NASA Technical Memorandum 4540.

Title: The First 50 Years Were Fine . . . But What Should We Do for an Encore?—The 1994 Alexander A. Nikolsky Lecture; By: Evan A. Fradenburgh; Journal of the American Helicopter Society; Jan. 1995.

Title: Rotorcraft Hub Shroud; By: LTC Chip Lunn; Brannon Industries; Apr. 11, 2006.

DRAG
50%
10%
40%
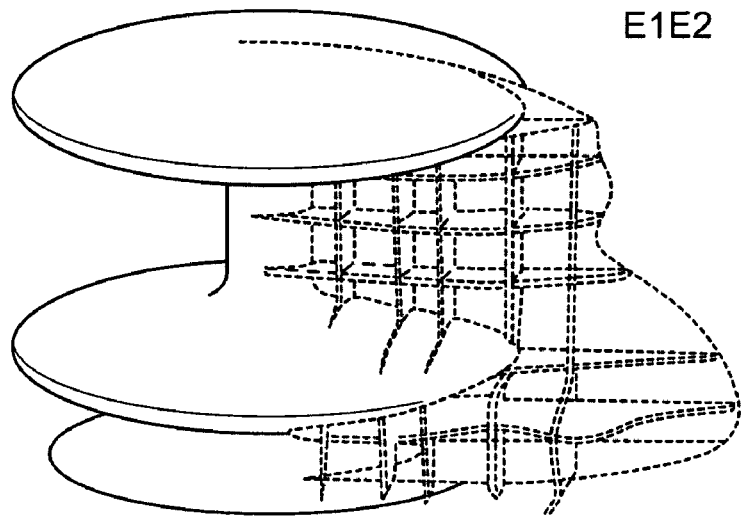
E1E2
DRAG
46%
20%
34%
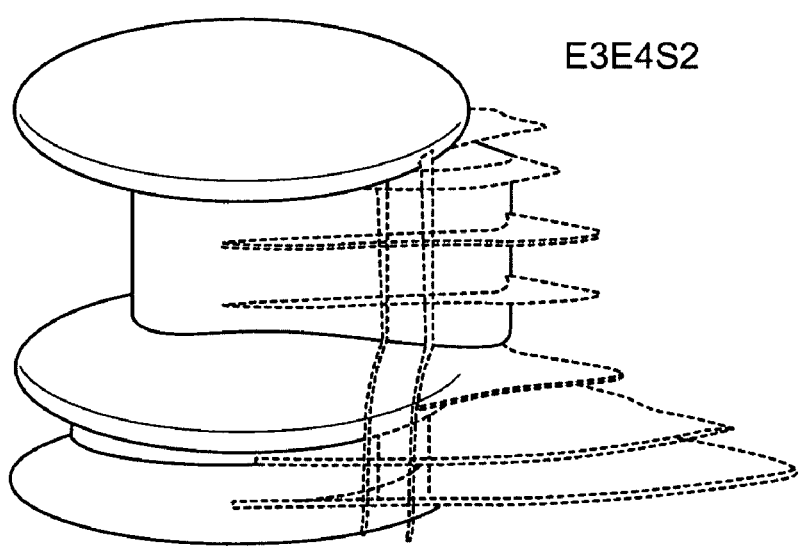
E3E4S2
*FIG. 3*

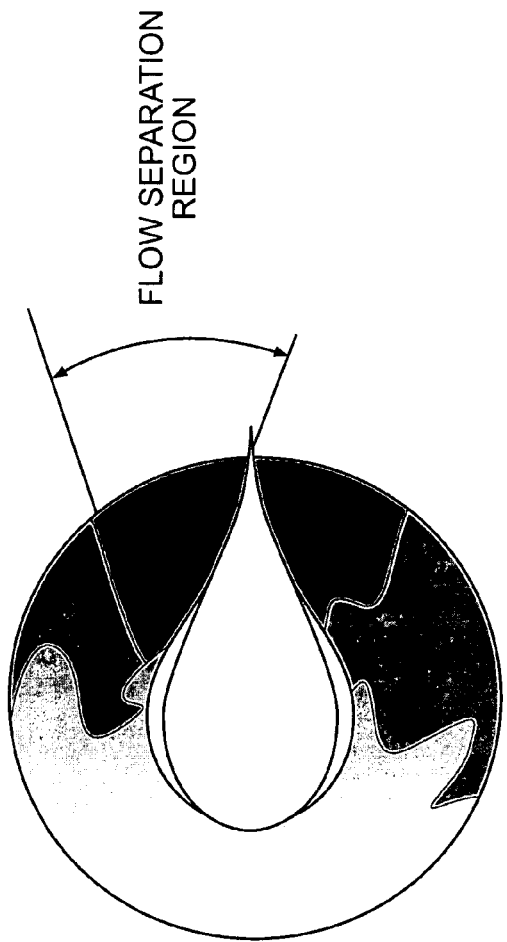
FIG. 4A — TOP HUB (UNDERSIDE), FLOW SEPARATION REGION
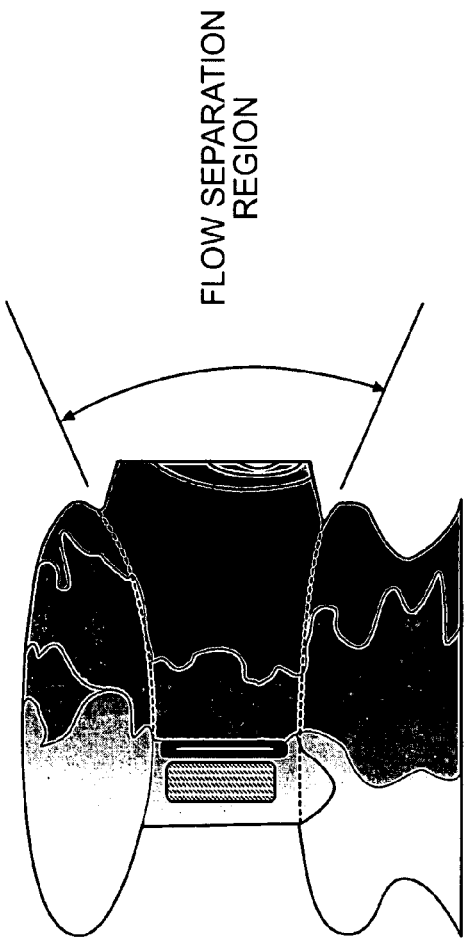
FIG. 4B — SIDE VIEW, FLOW SEPARATION REGION

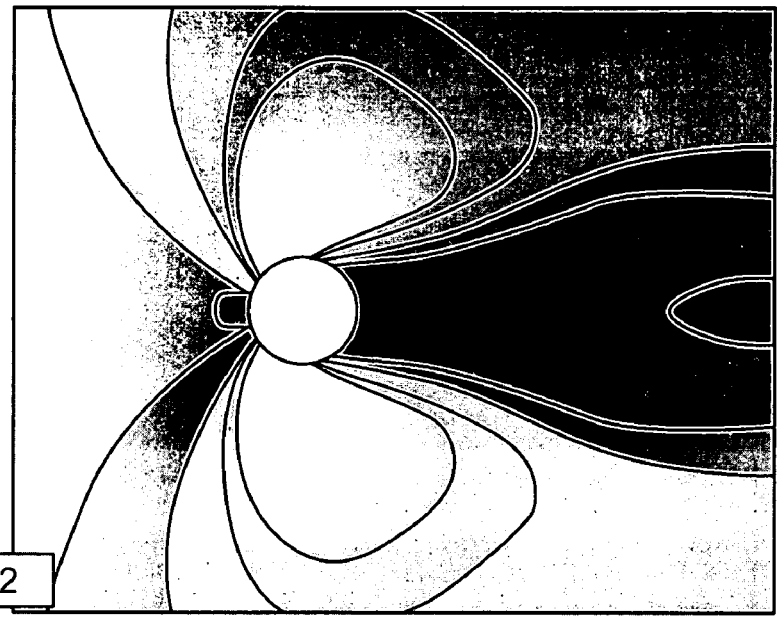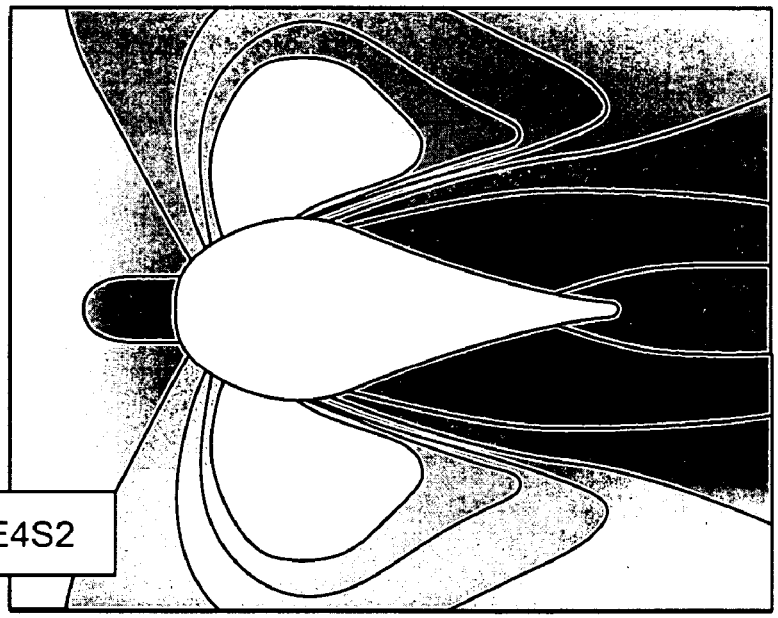
FIG. 5

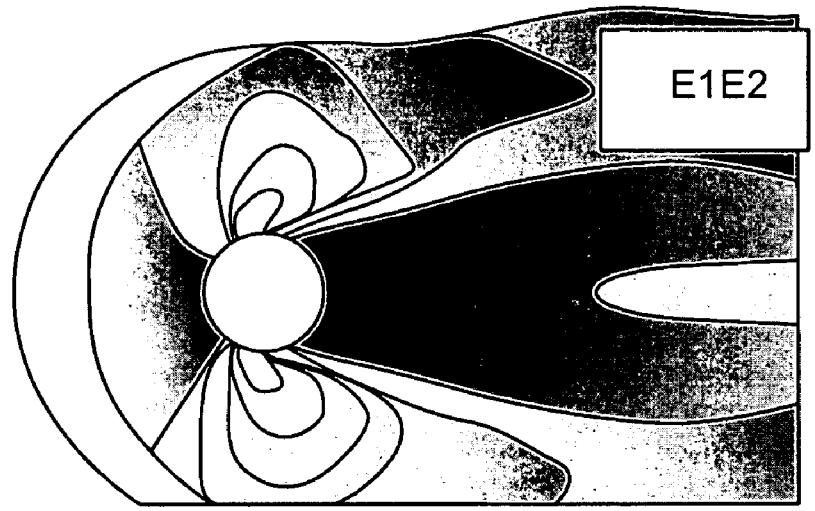
FIG. 6

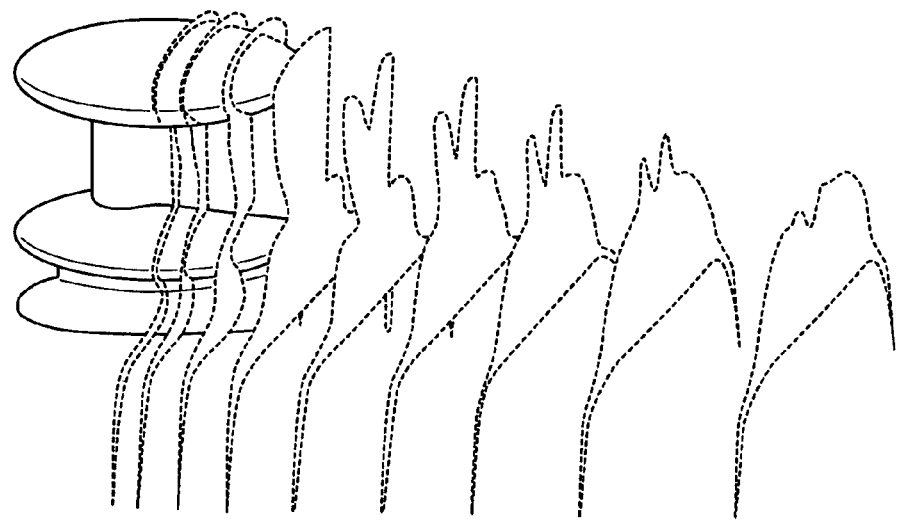
E3E4S2
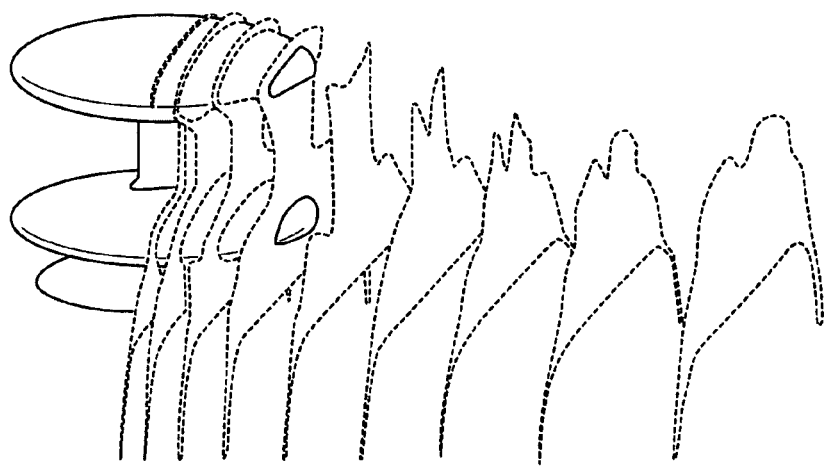
E1E2
FIG. 8

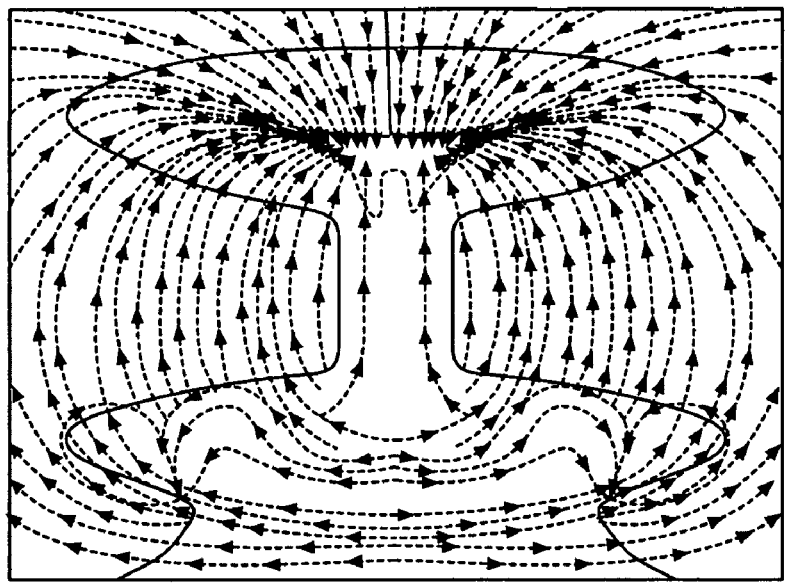
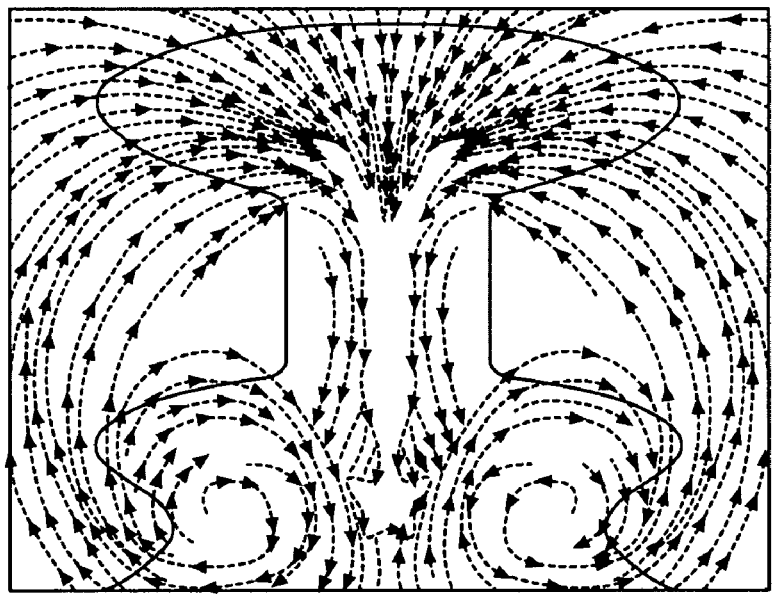
*FIG. 9*

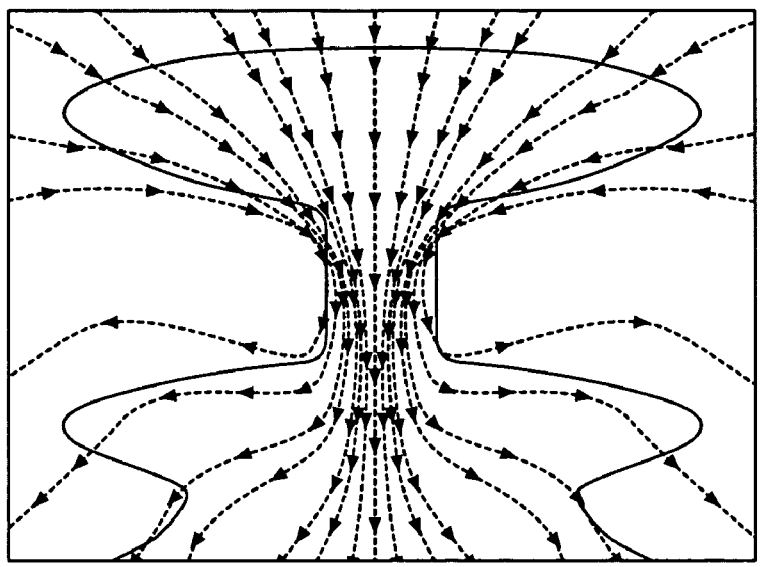
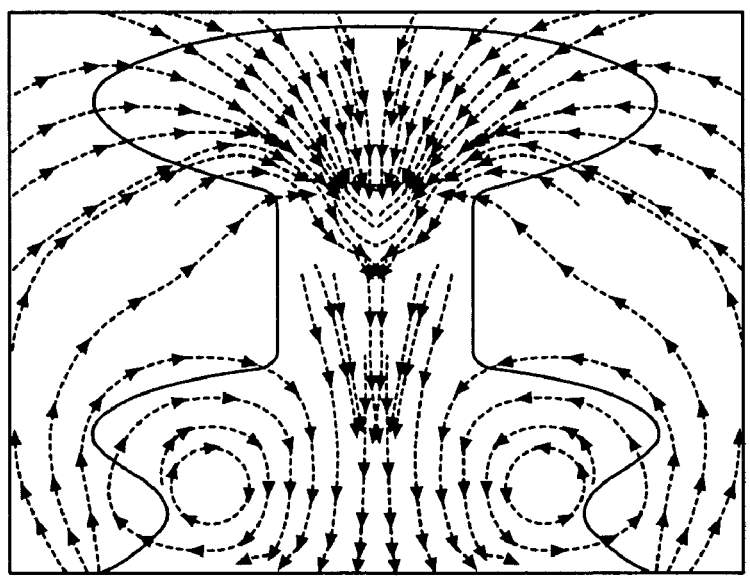
FIG. 10

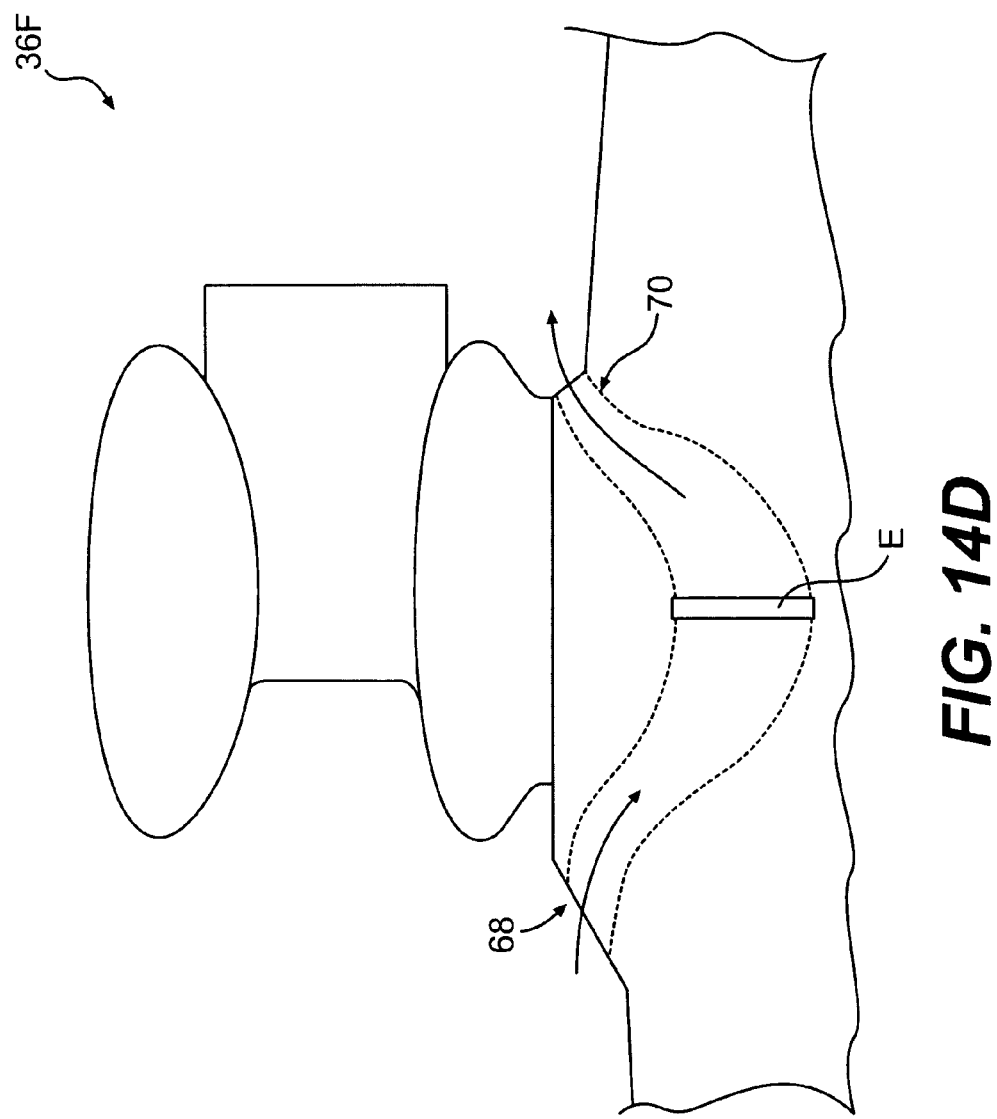

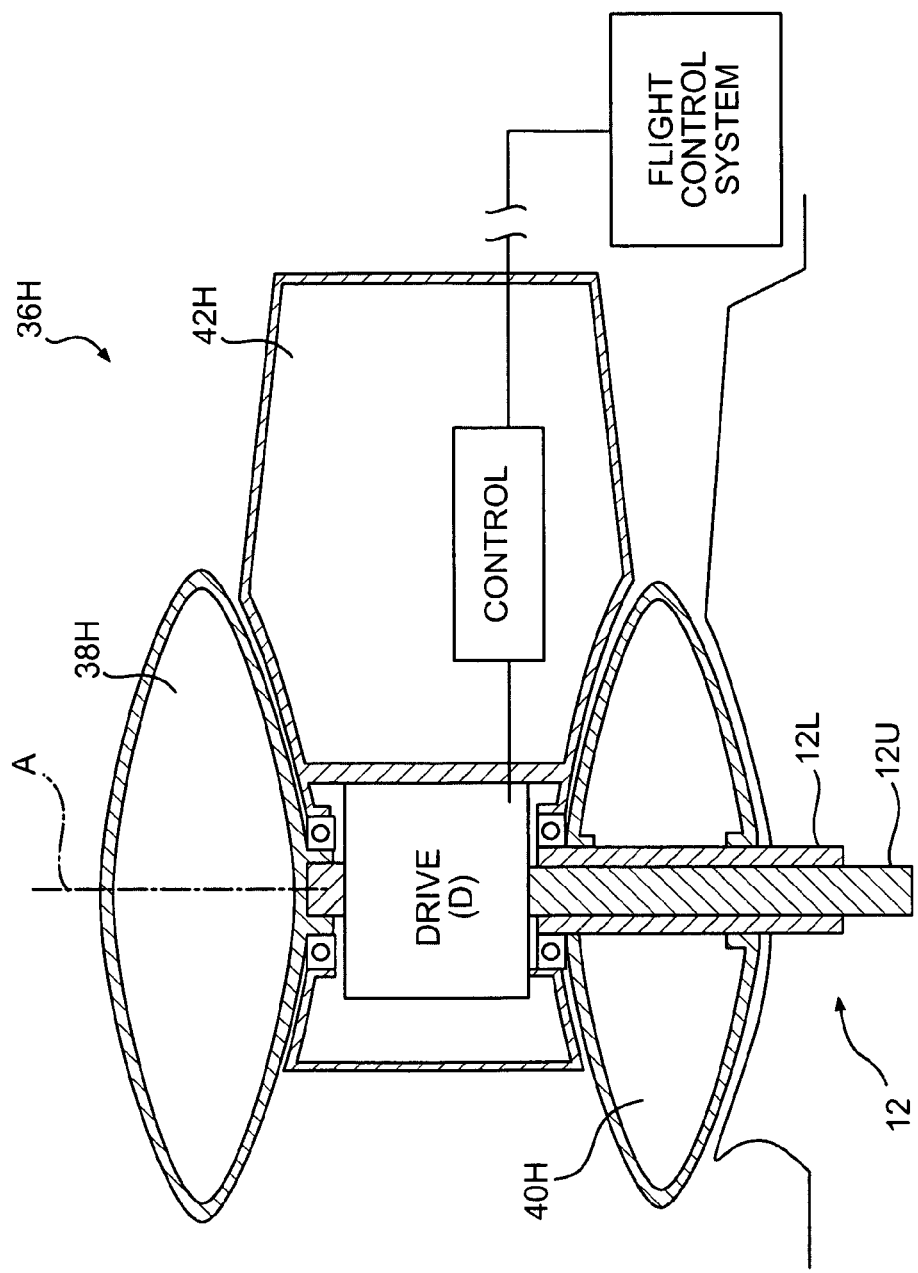

US 7,530,787 B2

ROTOR HUB FAIRING SYSTEM FOR A COUNTER-ROTATING, COAXIAL ROTOR SYSTEM

The present application is a continuation-in-part application that claims priority to U.S. patent application Ser. No. 11/141,246, filed May 31, 2005.

BACKGROUND OF THE INVENTION

The present invention is directed to a rotor hub fairing system, and more particularly, to a rotor hub fairing system which reduces overall drag for a high-speed rotary-wing aircraft having a counter-rotating, coaxial rotor system.

Typically, the aerodynamic drag associated with a rotor system of a rotary wing aircraft is a significant portion of the overall aircraft drag, typically 25% to 30% for conventional single-rotor helicopters. The rotor system drag increases for a rotary wing aircraft having a counter-rotating, coaxial rotor system primarily due to the additional rotor hub and the interconnecting main rotor shaft assembly between the upper and lower rotor systems. For high-speed rotary wing aircraft, the increased drag resulting from the counter-rotating, coaxial rotor system may result in a relatively significant power penalty.

The aerodynamic drag of the dual counter-rotating, coaxial rotor system is generated by three main components—the upper hub, the lower hub, and the interconnecting main rotor shaft assembly. The drag contribution may be approximately 40% for each of the rotor hubs, and 20% for the interconnecting shaft assembly.

Accordingly, it is desirable to provide a drag-reducing rotor hub fairing system for a rotary wing aircraft having a counter-rotating, coaxial rotor system.

SUMMARY OF THE INVENTION

A rotor hub fairing system for a dual, counter-rotating, coaxial rotor system according to the present invention generally includes an upper hub fairing, a lower hub fairing and a shaft fairing therebetween. The rotor hub fairing system is a system by which overall drag is reduced on a system level. That is, although the drag on an individual fairing component may be increased, through overall system design, the total drag of the rotor hub fairing system is reduced.

Applicants have discovered a plurality of different features for reducing the overall drag associated with the main rotor. Specifically, the Applicants have discovered that by fairing shaping, i.e., sizing and shaping the upper and lower hub fairings and the interconnecting shaft fairing to reduce the flow separation and interference drag, overall rotor hub drag can be decreased. That is, Applicants have discovered that by increasing the relative size of the shaft faring, overall drag on the rotor hub fairing system can be reduced even though the drag associated with the shaft fairing component is increased. This is because the thicker shaft fairing provides a positive effect on the upper hub fairing and the lower hub fairing by reducing flow separation on these components and exposed surface area on these components. Furthermore, the Applicants have further discovered that overall drag on the rotor hub fairing system can be reduced by reducing the diameter of the upper and lower hub fairings, even though the thickness ratio (ratio of thickness to diameter) of the fairing may increase. Thus, by increasing the size of the shaft fairing and by decreasing the size of the upper and lower hub fairings, the Applicants discovered that the overall total drag of the rotor hub fairing system is reduced.

Applicants have also discovered that overall drag on the rotor hub fairing system can be decreased by incorporating at least one airfoil member, such as a splitter or vane, which extends generally transverse to said shaft fairing. That is, Applicants discovered that by incorporating flow splitters and vanes air flow is encouraged to remain attached to the fairing system, which in turn causes overall rotor hub fairing drag to be reduced.

Applicants have also discovered that overall drag on the rotor hub fairing system can be decreased by incorporating flow control. That is, Applicants have discovered that by using steady and unsteady blowing concepts to reduce flow separation, overall rotor hub fairing drag can be reduced.

Applicants have also discovered that overall drag on the rotor hub fairing system can be decreased by incorporating vortex generators which create streamwise vorticity or secondary flow features that encourage the flow to remain attached on the fairing system, which in turn causes overall rotor hub fairing drag to be reduced.

Applicants have also discovered that overall drag on the rotor hub fairing system can be decreased by incorporating flow re-direction. That is, Applicants have discovered that by redirecting the airflow away from, or around, the hub fairing system, overall rotor hub fairing drag can be reduced.

By incorporating one or more of these features, Applicants have discovered that overall drag on the main rotor hub can be decreased.

The present invention therefore provides a drag-reducing rotor hub fairing system for a rotary wing aircraft having a counter-rotating, coaxial rotor system.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 3 is a computed total pressure contour produced by an E1E2 and E3E4S2 rotor hub fairing system with percentage distribution of component drag;

FIG. 4A is an underside view of an upper hub fairing illustrating a primary flow separation region;

FIG. 4B is a side view of a rotor hub fairing system illustrating the flow separation region of FIG. 4A from the side;

FIG. 5 is a computed Mach number contour taken through the middle of the E1E2 and E3E4S2 rotor hub fairing systems illustrating differences therebetween;

FIG. 6 is computed Mach number contour taken at the intersection of the shaft fairing and lower hub fairing surface of the E1E2 and E3 E4 S2 rotor hub fairing systems illustrating differences therebetween.

FIG. 8 is a computed vorticity magnitude contours at axial planes downstream of the E1E2 and E3E4S2 rotor hub fairing systems illustrating differences therebetween;

FIG. 9 is a comparison between the E1E2 and E3E4S2 rotor hub fairing system illustrating velocity vectors at a plane 0.5" downstream of the rotor hub fairing system;

FIG. 10 is a comparison between the E1E2 and E3E4S2 rotor hub fairing system illustrating velocity vectors at a plane 2" downstream of the rotor hub fairing system;

FIG. 14D is a schematic side view of another rotor hub fairing system with a complimentary airframe located intake and airframe located exhaust which reduces the flow separation penalty on the rotor hub fairing system;

FIG. 16A is a schematic side view of another rotor hub fairing system with an active shaft fairing.

DETAILED DESCRIPTION OF THE PREFERRED EMBODIMENT

Figure 1A:
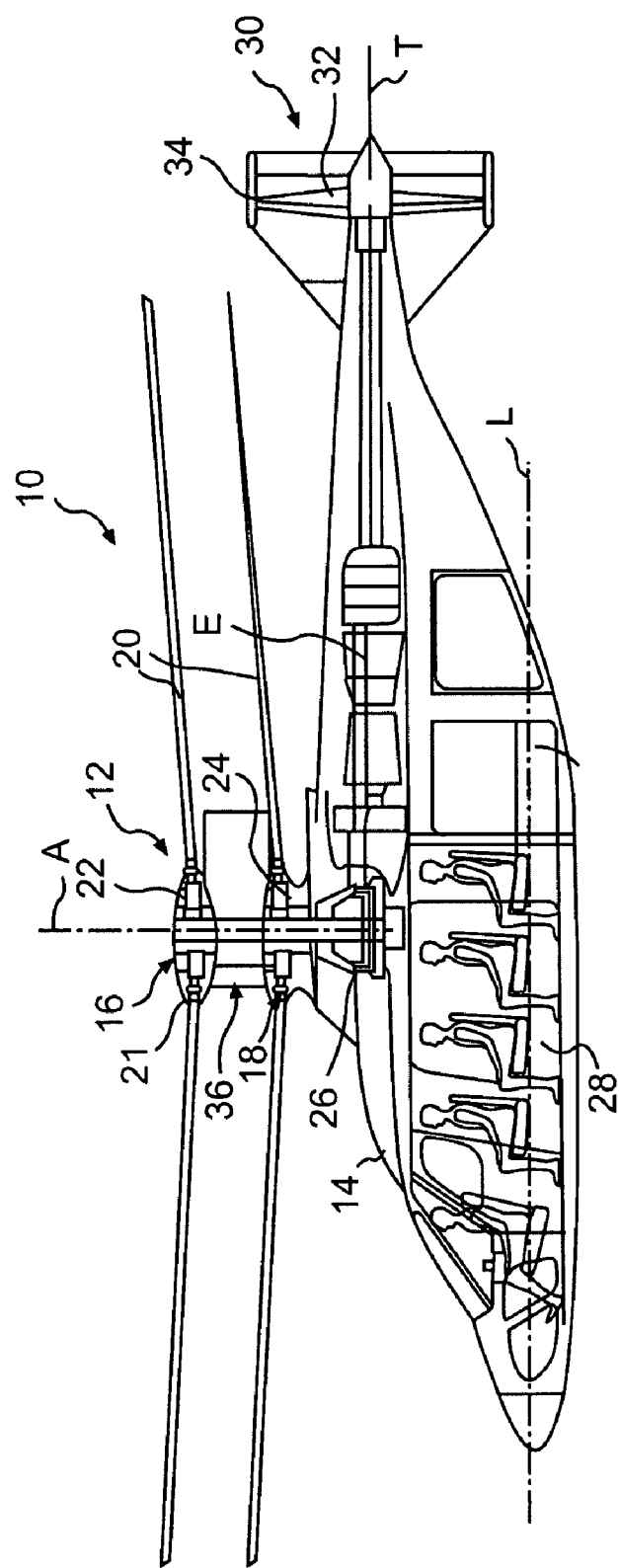
FIGS. 1A and 1B are general side views of an exemplary rotary wing aircraft embodiment for use with the present invention.
Figure 1B:
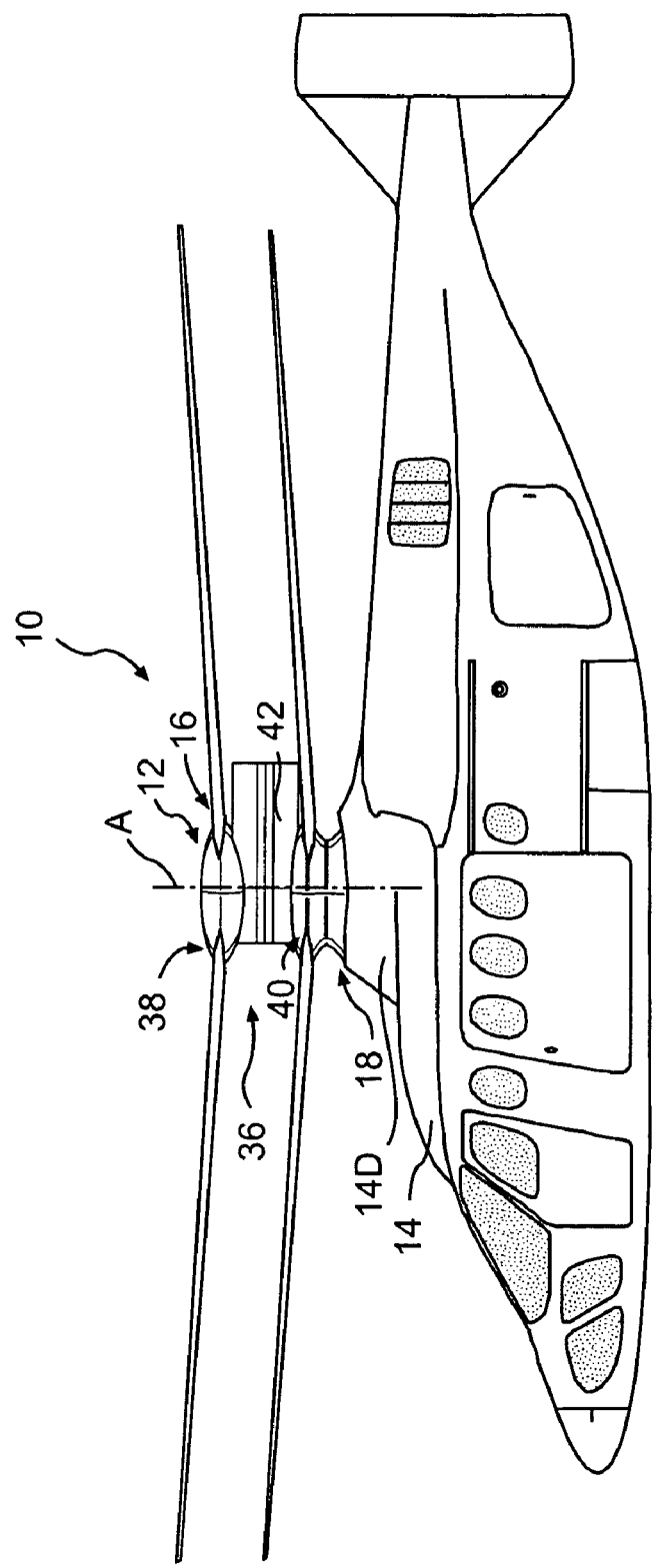

FIGS. 1A and 1B illustrate an exemplary vertical takeoff and landing (VTOL) rotary-wing aircraft 10 having a dual, counter-rotating, coaxial rotor system 12. The aircraft 10 includes an airframe 14 which supports the dual, counter rotating, coaxial rotor system 12 as well as a translational thrust system 30 which provides translational thrust generally parallel to an aircraft longitudinal axis L. Although a particular aircraft configuration is illustrated in the disclosed embodiment, other VTOL aircrafts may also benefit from the present invention.

The dual, counter-rotating, coaxial rotor system 12 includes an upper rotor system 16 and a lower rotor system 18. Each rotor system 16, 18 includes a plurality of rotor blades 20 mounted to a rotor hub 22, 24 for rotation about a rotor axis of rotation A. A plurality of the main rotor blades 20 extend outward from the hub assemblies 22, 24 and are connected thereto in any manner known to one of ordinary skill in the art (schematically illustrated at 21). Any number of blades 20 may be used with the rotor system 12.

A main gearbox 26 which may be located above the aircraft cabin 28 drives the rotor system 12. The optional translational thrust system 30 may be driven by the same main gearbox 26 which drives the rotor system 12. The main gearbox 26 is driven by one or more engines (illustrated schematically at E) and may be interposed between the gas turbine engines E, the rotor system 12 and the translational thrust system 30.

The translational thrust system 30 may be mounted to the rear of the airframe 14 with a rotational axis T oriented substantially horizontal and parallel to the aircraft longitudinal axis L to provide thrust for high-speed flight. Preferably, the translational thrust system 30 includes a pusher propeller 32 mounted within an aerodynamic cowling 34.

As shown, the rotor system 12 preferably also includes a rotor hub fairing system 36 generally located between and around the upper and lower rotor systems 16, 18 such that the rotor hubs 22, 24 are at least partially contained therein. It is known that a significant portion of the overall aircraft drag on a VTOL aircraft is due to the main rotor system. The rotor system drag increases for a rotary wing aircraft having a counter-rotating, coaxial rotor system primarily due to the additional rotor hub and the interconnecting main rotor shaft assembly between the upper and lower rotor systems. Additionally, the aerodynamic drag on a counter-rotating, coaxial rotor system 12 may be dominated by the pressure drag resulting from large-scale flow separation; typically, the skin-friction drag may contribute about 10% of overall aircraft drag. The rotor hub fairing system 36 achieves a significant drag reduction in which large-scale flow separation is greatly reduced.

In accordance with the principles of the present invention, the rotor hub fairing system 36 preferably includes an upper hub fairing 38, a lower hub fairing 40 and a shaft fairing 42 therebetween. Preferably, the rotor hub fairing system 36 is sized and configured to reduce interference effects between the separate fairing components 38, 40, 42 and to minimize flow separation in the junction areas. The shaft fairing 42 preferably follows the contours of the upper hub fairing 38 and the lower hub fairing 40 at the rotational interfaces therebetween. Furthermore, the lower hub fairing 40 is preferably sized and configured to follow the contours of the airframe 14 in an area typically referred to on a rotorcraft as a pylon 14D.

The rotor hub fairing system 36 preferably further reduces drag by accounting for interference effects to optimize surface distributions over the specific system. Detailed surface modifications of intersecting surfaces including fillets and modified interface shapes may also be utilized to further optimize drag reduction.

Figure 1C:
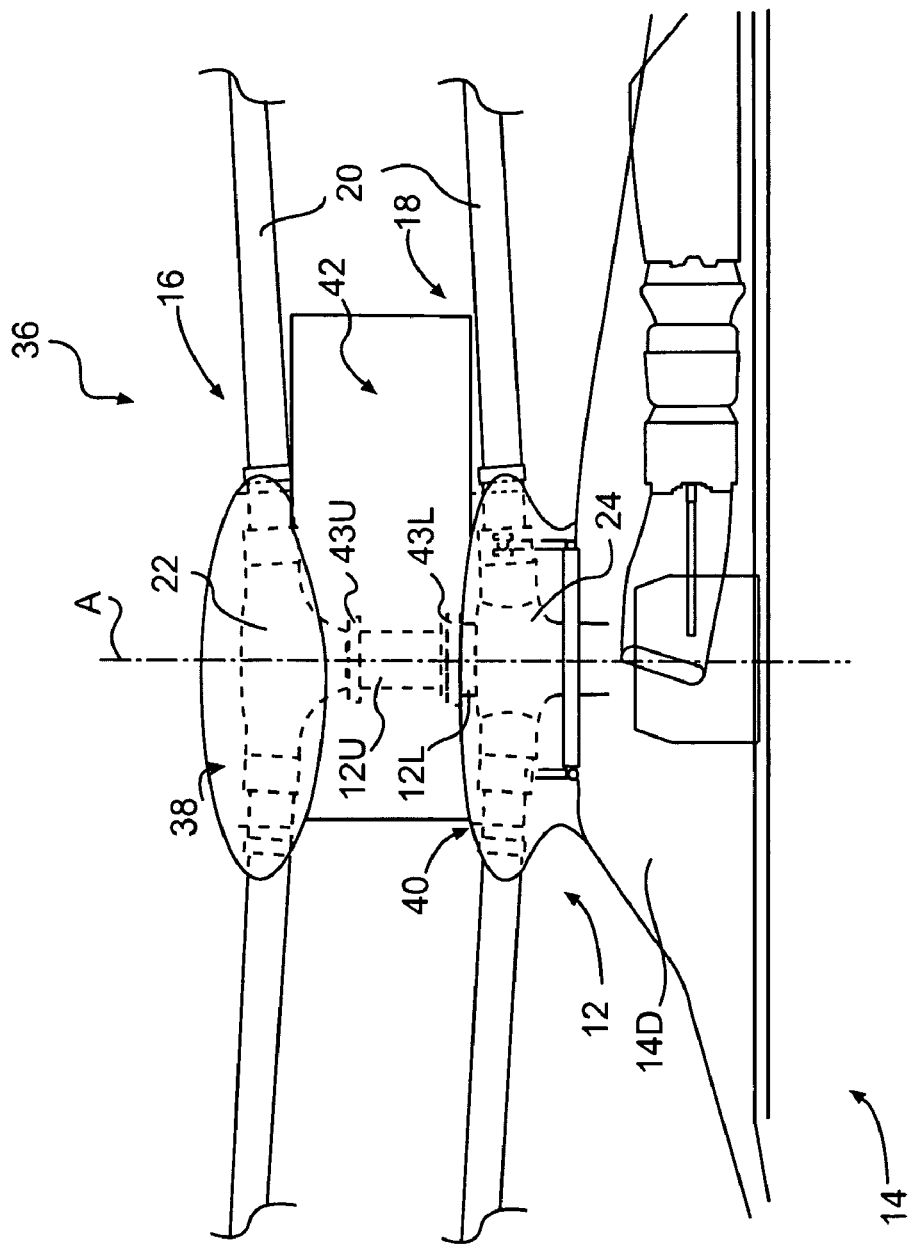
FIG. 1C is an expanded partial phantom view of a counter-rotating coaxial rotor system with a rotor hub fairing system according to the present invention.

Referring to FIG. 1C, the shaft fairing 42 is preferably attached to the counter-rotating, coaxial rotor system 12 through a bearing arrangement 43U, 43L (illustrated schematically) such that the shaft fairing 42 is aligned with the relative wind in forward flight but may alternatively be free to pivot during low speed maneuvering. The upper bearing 43U and the lower bearing 43L are respectively located adjacent an upper portion and a lower portion of the shaft fairing 42. The upper bearing 43U is preferably attached to one rotor shaft 12U while the lower bearing 43L attached to the other rotor shaft 12L such that the bearings are counter rotating and net bearing drag is relatively low. Although other mechanisms for attaching the shaft fairing 42 to the counter-rotating, coaxial rotor system 12 may be used.

In accordance with the principles of the present invention, Applicants have discovered a plurality of different features for reducing the overall drag associated with the main rotor. Each of these features will now be in described in turn. It should be appreciated that each of these features may be used either singularly or in any combination.

Fairing Reshaping

Figure 2:
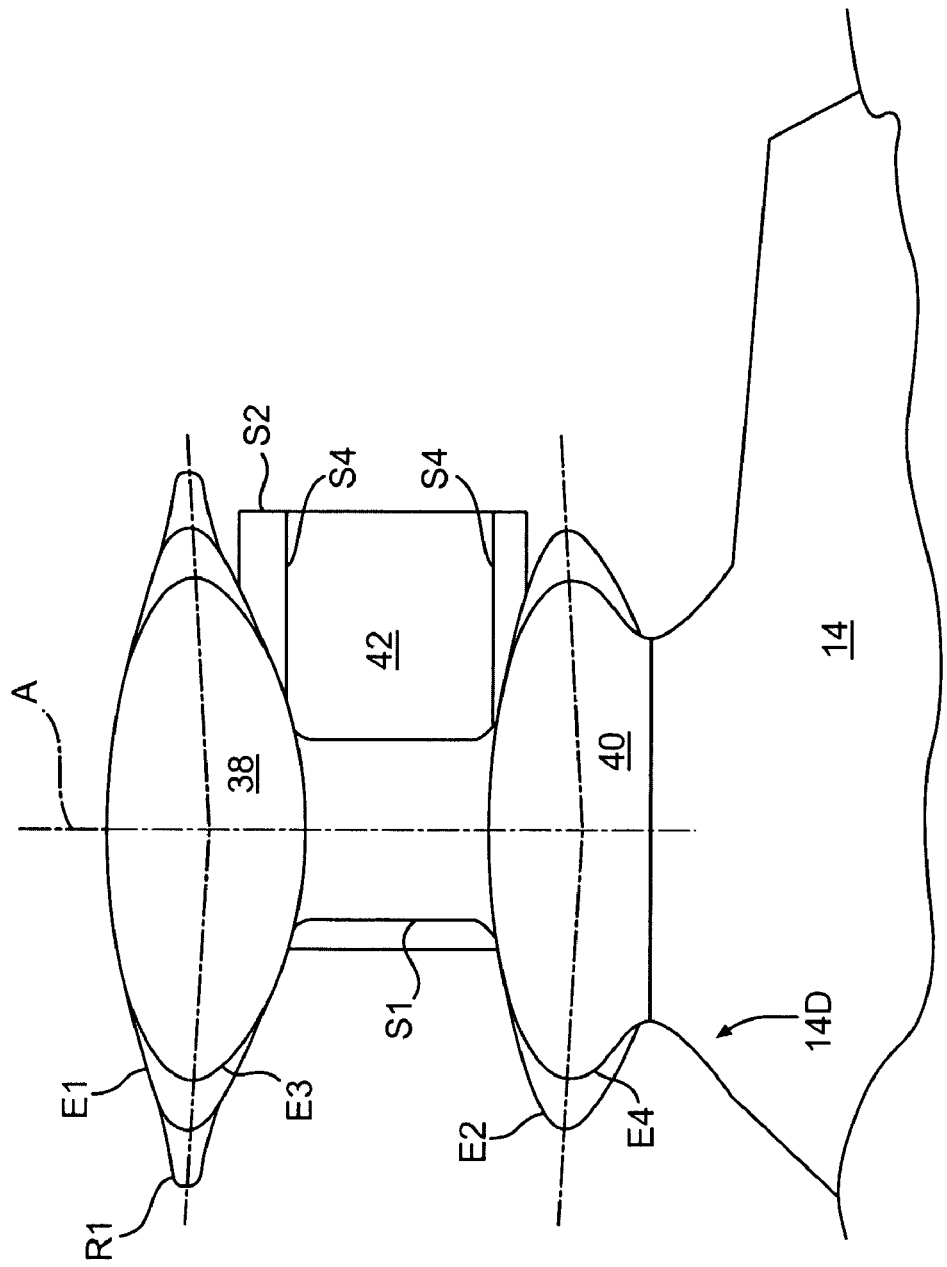
FIG. 2 is a schematic view of a rotor hub fairing system illustrating various combinations of an upper hub fairing, a lower hub fairing, and a shaft fairing therebetween.

Referring to FIG. 2, Applicants have tested thirteen total combinations of three upper hub fairings (E1, R1, and E3), two lower hub fairings (E2, E4), and three shaft fairings (S1, S2, S4). A summary of the drag values (normalized to a bare main rotor hub) are provided in Table 1. The wind-tunnel test conditions are given in Table 2.

TABLE 1

Summary of the Wind Tunnel Configurations and Flat Plate Values (Non-Rotating w/o Blade Stubs).

| Configuration | Name | Relative Drag | Percent Reduction |
|---|---|---|---|
| Bare Hub | Baseline | 1.0 | 0% |
| E1 + E2 + S1 | E1E2 | 0.89 | 11% |
| E1 + E2 + S2 | E1E2S2 | 0.80 | 21% |
| R1 + E2 + S1 | R1E2 | 0.83 | 17% |
| R1 + E2 + S2 | R1E2S2 | 0.84 | 16% |
| E3 + E4 + S1 | E3E4 | 0.78 | 22% |
| E3 + E4 + S2 | E3E4S2 | 0.68 | 32% |
| S2 | S2 | 0.97 | 3% |
| E3 + E4 + S4 | E3E4S4 | 0.75 | 25% |
| E1 + E4 + S4 | E1E4S4 | 0.79 | 21% |

TABLE 2

Flight Conditions.

| | 1/5 Scale Wind Tunnel Test |
|---|---|
| Speed | 300 knots |
| Ambient | SLS |
| Mach Number | 0.45 |
| Rotor Hub Diameter | 10" |
| Reynolds Number | 2,700,000 |

Of the thirteen configurations tested in the wind tunnel, the E3E4S2 combination reduced the drag from the "baseline" by 32%, while the rotor hub fairings alone (E1E2) reduced drag from the "baseline" by 11%. The E3E4S2 incorporated a generally elliptical, in cross-section, upper and lower hub fairings and a relatively thick (t/c of about 40%) airfoil-type shape (in horizontal cross-section) for the shaft fairing. The t/c was adjusted to 28% at the mid-section, and about 42% at the ends. The thickness (t) was the same at the mid-section, but the chord (c) was increased to reduce t/c at the mid-section, the thickness (t) at the ends increased.) Without a fairing around the interconnecting main rotor shaft (which is a cylinder), the E1E2 geometry is axisymmetric about the rotor hub axis of rotation A.

Referring to FIG. 3, contours of total pressure are shown in several horizontal planes for the E1E2 and E3E4S2 geometries along with the contributions of each component to the total drag (fuselage pylon drag not included). The low values of total pressure (dark shading) are indications of momentum loss, thus drag. Flow separation is a significant contributor to the drag in which about 90% of the drag is from the pressure drag.

Table 3 provides a more detailed breakdown between the pressure and viscous drag. It can be seen that pressure drag contribution varies from 90% to 96% among the different components.

TABLE 3

Pressure Contributions to Drag

| | Pressure | Viscous |
|---|---|---|
| E1E2 | | |
| Top | 90% | 10% |
| Middle | 96% | 4% |
| Bottom | 95% | 5% |
| Total | 93% | 7% |
| E3E4S2 | | |
| Top | 92% | 8% |
| Middle | 96% | 4% |
| Bottom | 95% | 5% |
| Total | 94% | 6% |

The primary difference between E1E2 and E3E4S2 is the flow around the interconnecting shaft area. The E1E2 geometry produces a substantial wake from the cylindrical shaft. Even though the shaft does not contribute significantly to the overall drag (only 10%), since its cross-sectional area is relatively small, the shaft significantly impacts the drag of the upper hub fairings (E1, R1, and E3) and lower hub fairings (E2, E4).

Table 4 shows the components of the drag for the E1E2 and E3E4S2 arrangements and their associated percent change. The drag of the interconnecting shaft fairing of E3E4S2 increased by 55%, as compared to E1E2 which contained no shaft fairing, due to the larger surface area of the S2 shaft faring. However, incorporation of the thicker shaft fairing provided a positive effect on the upper hub fairing and the lower hub fairing by reducing flow separation on these components and exposed surface area on these components. Furthermore, the drag of the upper hub fairing and the lower hub fairing was reduced as compared to E1E2 by decreasing the overall size of the upper and lower hub fairings. Thus, by increasing the size of the shaft fairing and by decreasing the size of the upper and lower hub fairings, the Applicants discovered that the overall total drag of the rotor hub fairing system is reduced.

TABLE 4

Components of Drag (Normalized)

|  | E1E2 | E3E4S2 | % Change |
|---|---|---|---|
| Top | 0.45 | 0.31 | −31% |
| Middle | 0.09 | 0.14 | +55% |
| Bottom | 0.36 | 0.23 | −36% |
| Total | 0.89 | 0.68 | −24% |

The relative surface areas of the upper and lower hub fairings and interconnecting shaft fairing are given in Table 5. As noted, the surface area increase of the interconnecting shaft for E3E4S2 is almost 217% as compared to E1E2. Thus, the incorporation of a shaft fairing increases the drag on the shaft fairing but, as previously stated, significantly reduces the drag on the upper hub fairing and the lower hub fairing.

TABLE 5

Surface Area of the Rotor Hub Components (Normalized)

|  | E1E2 | E3E4S2 | % Change |
|---|---|---|---|
| Top | 0.47 | 0.32 | −32% |
| Middle | 0.04 | 0.14 | +217% |
| Bottom | 0.49 | 0.34 | −30% |
| Total | 1.00 | 0.80 | −20% |

Referring to FIGS. 4A and 4B, vorticity contours on the surface are shown, providing an indication of the separation points and sources of drag increase. On the underside of the upper hub fairing (FIG. 4A), the flow separation region lines indicate a relatively large region of flow separation that may be minimized to obtain further total drag reduction. A similar flow separation pattern is present on the upper side of the lower rotor hub fairing. On the side view (FIG. 4B), considerable flow separation is present from the interconnecting shaft fairing. The source of this flow separation is the interaction of the upper and lower hubs with the shaft-fairing thickness and shape.

Since the area increase in the middle section of the shaft fairing and its shape has a significant effect on shaft-fairing drag, as well as overall drag, a comparison of the Mach number contours at the mid-section of the shaft fairing are shown in FIG. 5 for E1E2 and E3E4S2 geometries. Because of the circular shape of the E1E2 interconnecting shaft, the separated flow or wake region behind the cylinder is relatively large (dark shaded area). Meanwhile using a relatively thicker, airfoil-shaped shaft fairing results in less separated flow or a smaller wake region behind the shaft (smaller dark shaded area). Thus, incorporation of the airfoil-shaped shaft fairing results in improved flow quality since the airfoil-shaped shaft fairing minimizes the separation region which reduces the drag on the upper and lower hub fairings by improving the flow quality on surfaces of the hub fairings.

To further emphasize this effect, the Mach number iso-contours at the intersection of the shaft-fairing and the lower hub are illustrated in FIG. 6. It is noted that the airfoil-shaped shaft fairing has the same effect on the upper hub fairing, however for simplicity, only the lower hub is here illustrated.

Figure 7:
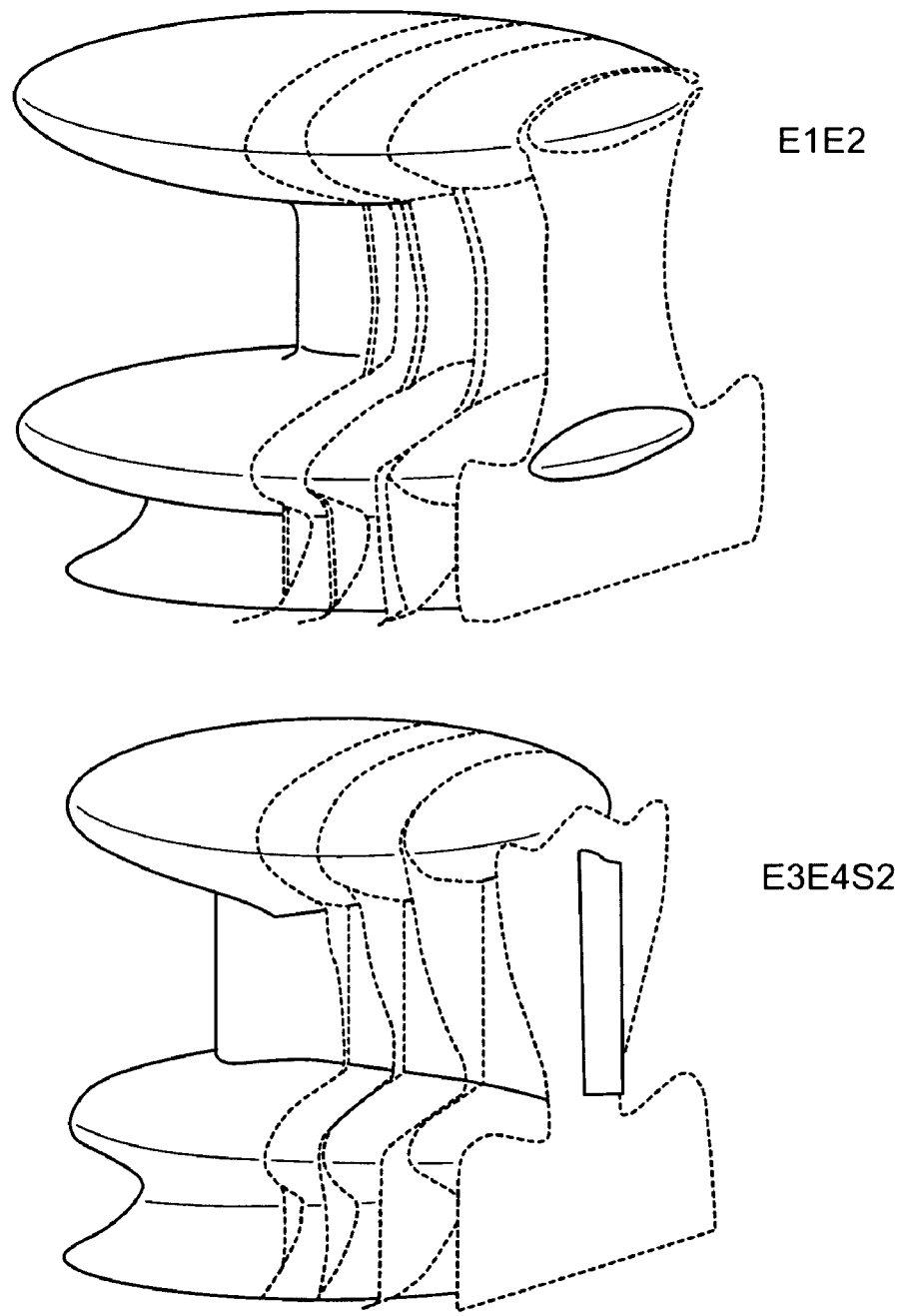
FIG. 7 is a computed vorticity magnitude contour at axial planes of the E1E2 and E3E4S2 rotor hub fairing systems illustrating differences therebetween.

Referring to FIG. 7, a comparison of the vorticity magnitude contours are shown in different axial planes on the surface of E1E2 and E3E4S2 geometries. The darker shading indicates low vorticity which indicates flow separation. The E3E4S2 airfoil-shaped shaft fairing essentially cleans the dead flow region (shown as the darker shading) of the E1E2 shaft geometry. Vorticity contours further downstream are also shown in FIG. 8 for the E1E2 and E3E4S2 geometries. Since two counter-rotating vortices will form and convect downstream, reduced E3E4S2 drag reduces flow disturbances and interference with the tail.

FIGS. 9 and 10 illustrate the velocity vectors by Mach number at different axial planes downstream of the rotor hub for the E1E2 and E3E4S2 geometries. These figures illustrate that the circulation region is essentially eliminated when the airfoil-shaped shaft fairing of the E3E4S2 geometry is incorporated. Notably, reduced downstream counter-rotation vortices behind the rotor hub also result from E3E4S2 geometry.

Applicants have demonstrated that by incorporating a thicker shaft fairing the overall drag on the rotor fairing system is reduced even though the drag associated with the shaft fairing component is increased. This is because of the positive effect the shaft fairing has on the upper and lower hub fairings. Furthermore, the Applicants have discovered that the overall drag of the upper and lower hub fairings can be further reduced by minimizing the size and shape of the hub fairings. Notably the Applicants were able to reduce the overall drag on the rotor hub fairing system by 24% (it should be noted that results will vary depending on the particular size and shape of the rotor hub fairing system, which is dependent on the size of the aircraft).

Moreover, Applicants have discovered that additional drag reduction may be achieved by reducing the thickness of the shaft fairing at the shaft fairing midsection 46 while increasing the thickness of the shaft fairing at the outer shaft fairing sections 48. This contoured shape (as shown in FIGS. 11A-11F) reduces the flow separation on the upper and lower hub fairings 38, 40 without creating overly excessive drag on the hub fairing system 36 by reducing the extent of flow separation (illustrated as shaded area in FIG. 11F).

Figure 11A:
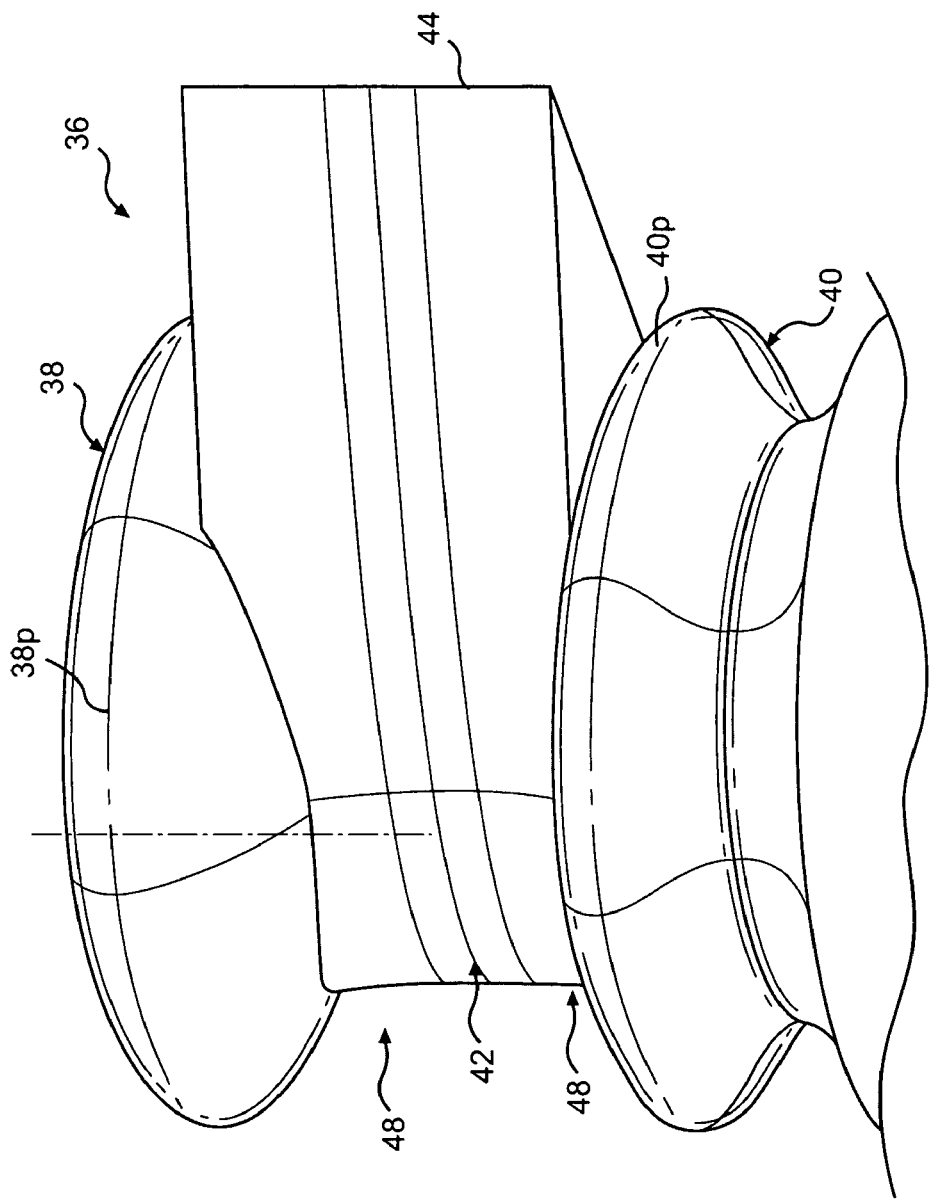
FIG. 11A is an oblique aft perspective view of a rotor hub fairing system.
Figure 11B:
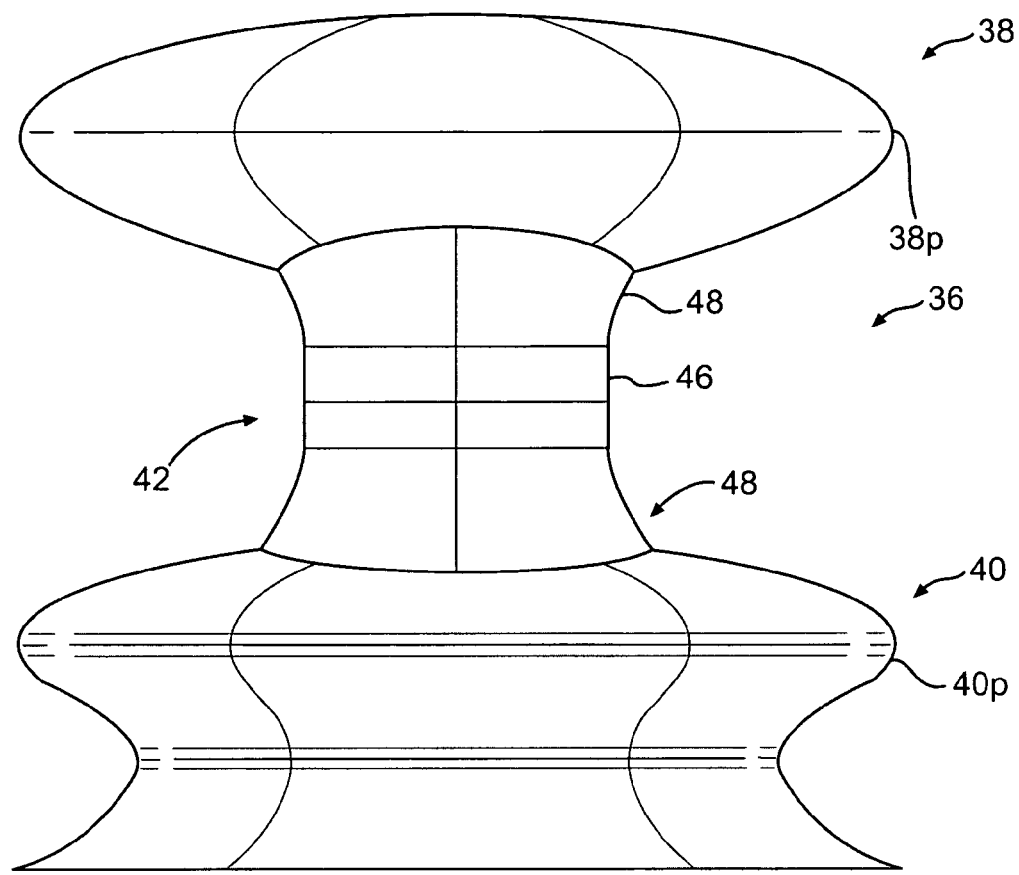
FIG. 11B is a front view of the rotor hub fairing system of FIG. 11A.
Figure 11C:
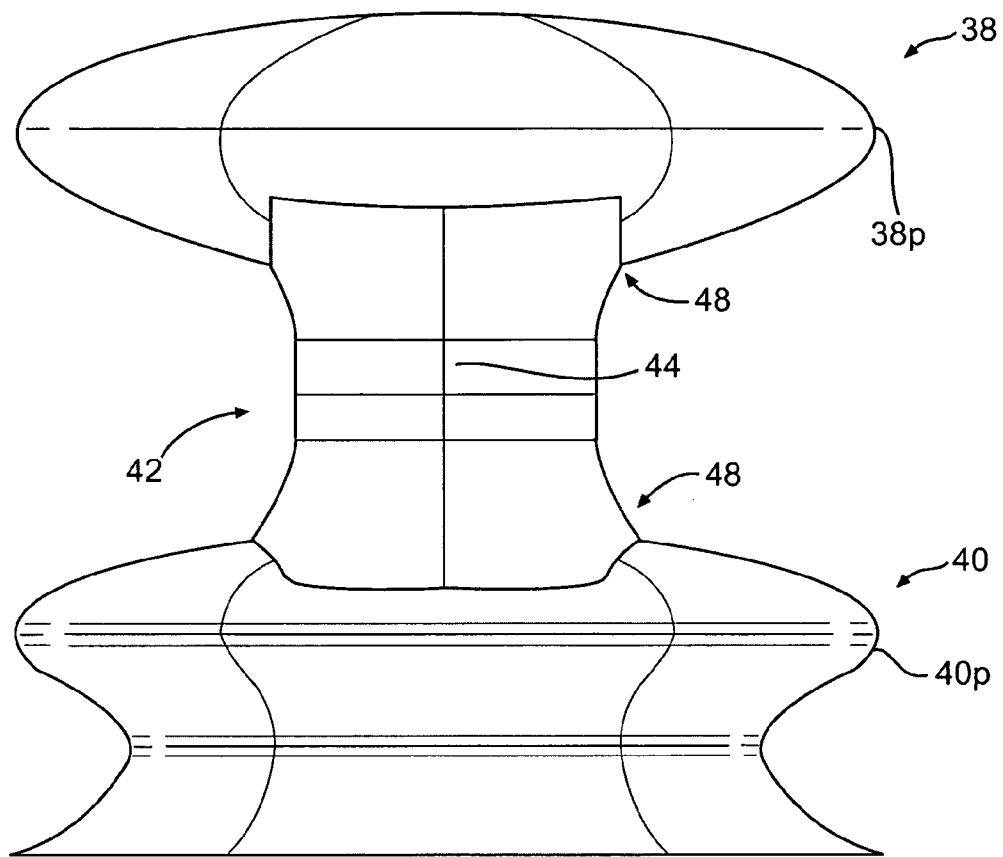
FIG. 11C is a rear view of the rotor hub fairing system of FIG. 11A.

Referring to FIG. 11A, one preferred embodiment of the rotor hub fairing system 36 (X2 in Table 6) which further improves upon the E3E4S2 geometry is shown. The rotor hub fairing system 36 includes a shaft fairing 42 that has a thickness distribution between the upper and lower rotor hub fairings 38, 40 with a minimal thickness at the shaft fairing's midsection 46 such that the shaft fairing 42 has a general hourglass like shape (FIGS. 11B and 11C). That is, the outer shaft fairing sections 48 adjacent the upper and lower hubs 38, 40 defines a thicknesses greater than the shaft fairing midsection 46 (also schematically illustrated in FIG. 11C).

The outer shaft fairing sections 48 operate to mask the high-drag area of the upper hub fairing 38 and lower hub fairing 40 rotational interfaces. That is, the relatively thicker shaft fairing 42 reduces overall drag, even though the drag from the shaft fairing 42 itself is increased.

The shaft fairing 42 also preferably includes a trailing edge 44 (FIG. 11E) that extends aft of a periphery 38p, 40p defined by the upper hub fairing 38 and the lower hub fairing 40 to substantially reduces pressure drag. It should be noted that although the shaft fairing 42 may increase skin-friction drag due to increase in surface area, reduced pressure drag results in significant overall drag reduction.

Regarding shaft fairing chord/rotor hub fairing diameter (c/D), the shaft fairing 42 defines a preferred shaft fairing chord length range between c=0.80×D to 1.50×D, more preferably c=0.90×D to 1.25D, and even more preferably between 110% and 120% of the rotor hub fairing diameter (D). With a pitch axis P (FIG. 11D) defined at a quarter chord (c/4) location, the shaft fairing length (L) that extends beyond the hub periphery 38p, 40p may be defined by the equation:

$$L=(0.75*(c/D)-0.5)*D.$$

Figure 11D:
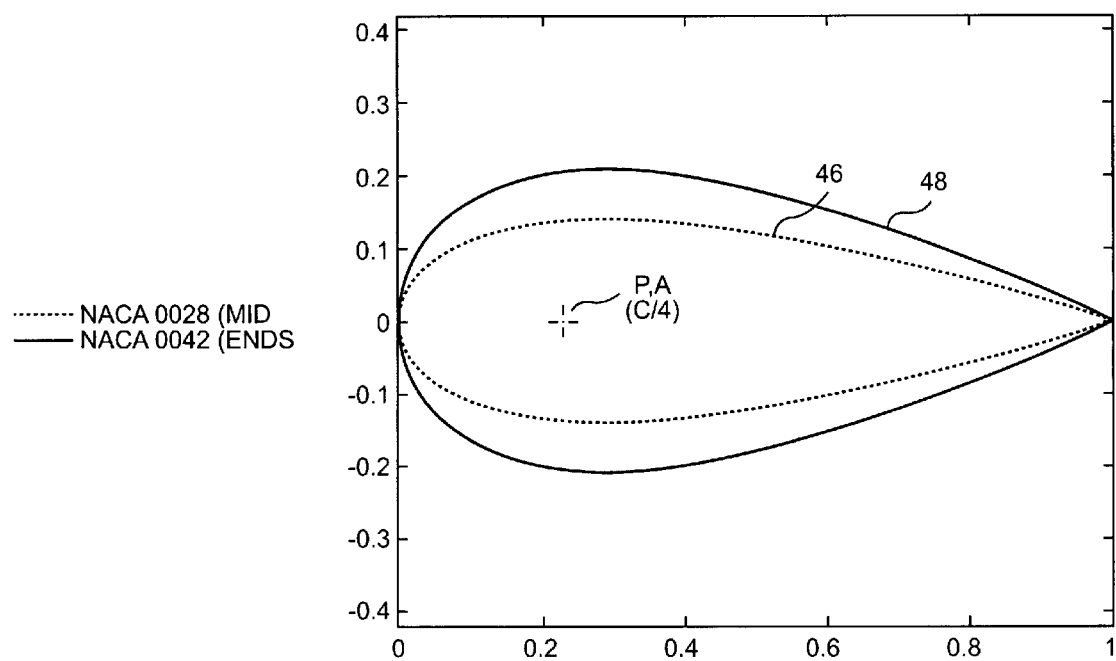
FIG. 11D is a schematic view of the airfoil shapes utilized with the shaft fairing of the rotor hub fairing system of FIG. 11A.
Figure 11E:
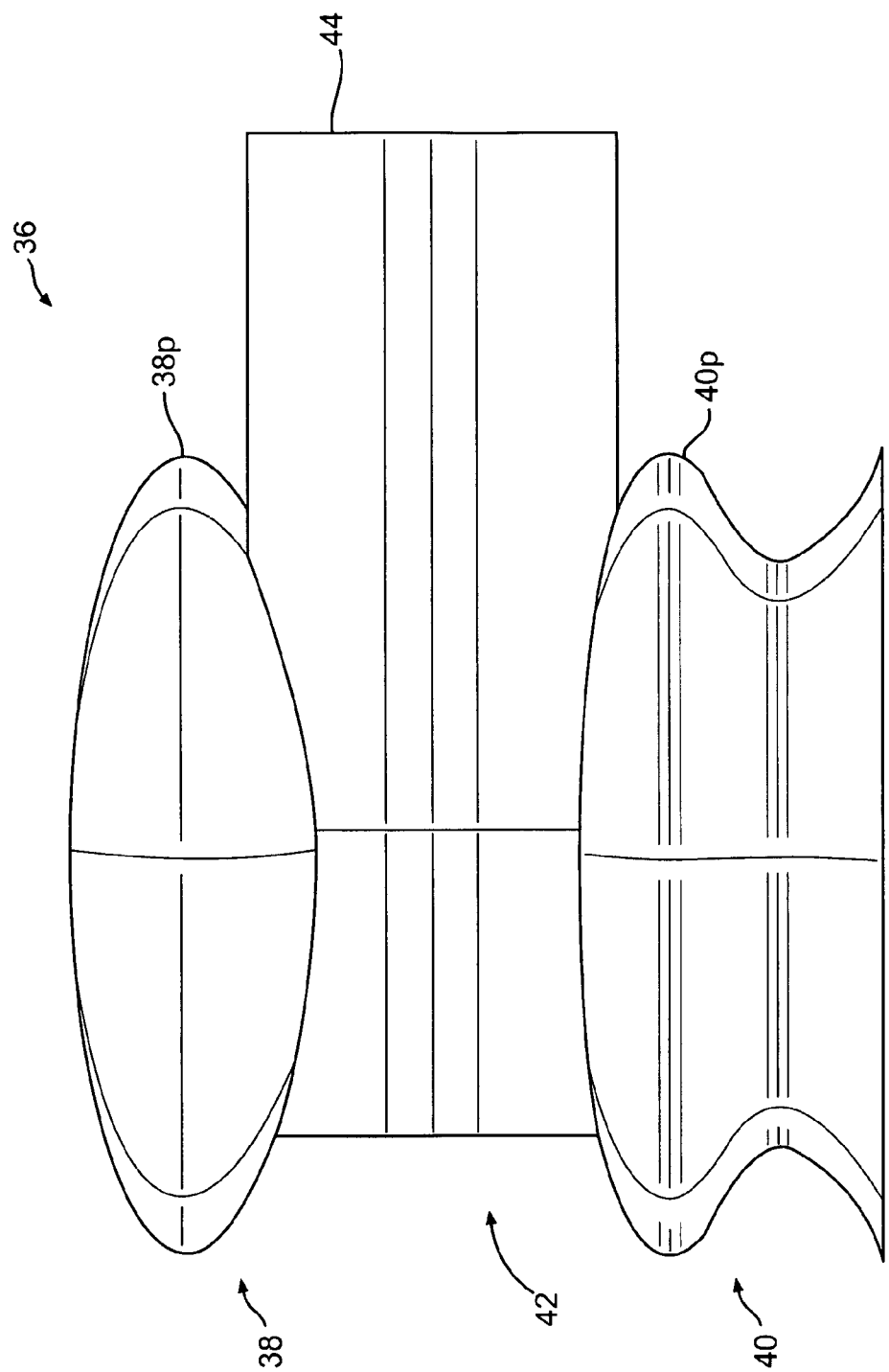
FIG. 11E is a side view of the rotor hub fairing system of FIG. 11A.
Figure 11F:
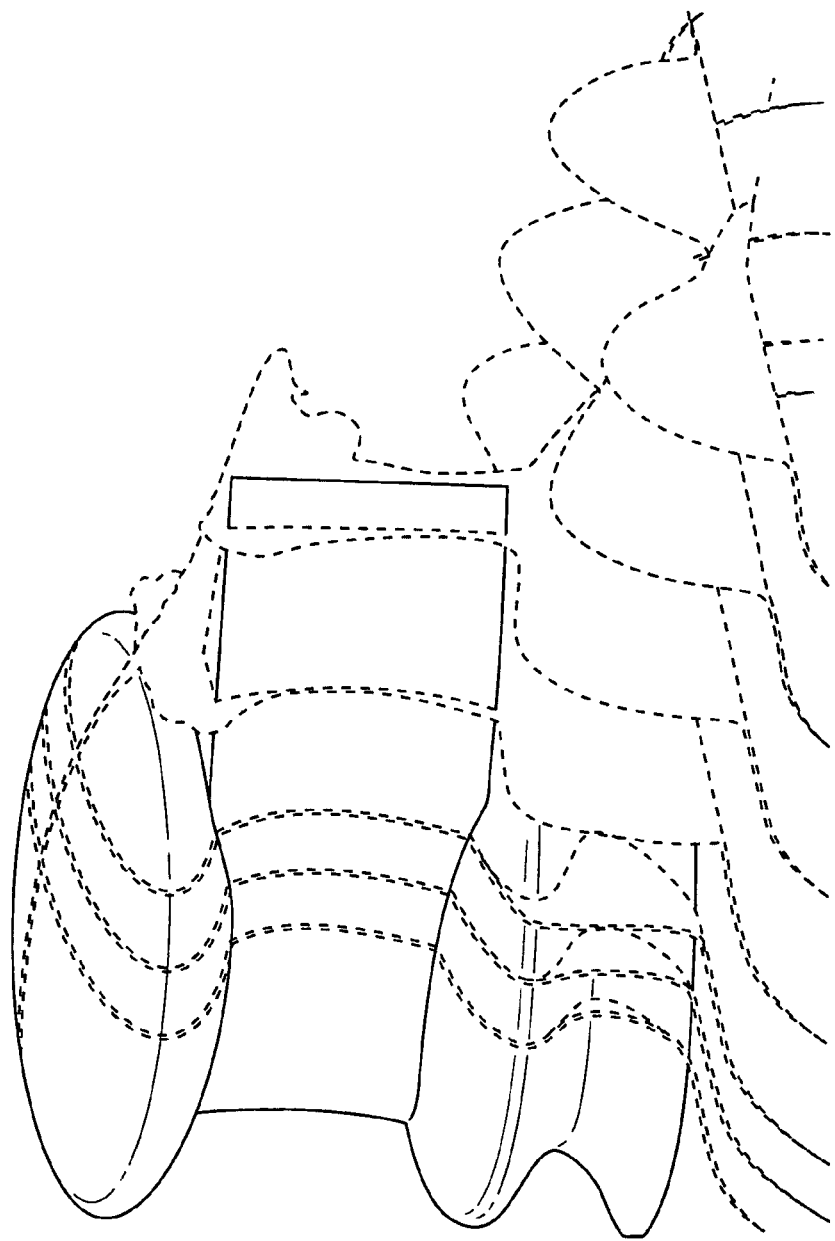
FIG. 11F is a computed total pressure contour produced by the rotor hub fairing system of FIG. 11A.

Referring to FIG. 11D, the shaft fairing 42 preferably defines airfoil shapes proportionate with NACA 0028 and NACA 0042 series airfoils along the shaft fairing midsection 46 and the outer shaft fairing section 48, respectively as airfoil shape also operates to reduce total drag. The shaft fairing 42 preferably defines a percent thickness, i.e., % thickness/(chord length), of 24% at the shaft fairing midsection 46 and 42% at the outer section 48. Preferably, the shaft fairing 42 also includes a symmetric aft thickness distribution which reduces pressure drag on the upper and lower hub fairings 38, 40. Most preferably, the shaft fairing 42 locates the pitch axis P at the quarter chord (c/4) location. The pitch axis P is preferably coaxial with the rotor axis of rotation A. It should be understood that other airfoil shapes are also usable with the present invention.

Preferred geometry for the shaft fairing 42 is summarized in Table 6:

TABLE 6

Shaft Fairing Geometry

|  |  | c/D | t/D-mid | t/D-end | t/c-mid | t/c-ends |
|---|---|---|---|---|---|---|
| E3E4S2 geometry | | 0.82 | 0.35 | 0.35 | 0.43 | 0.43 |
| "X2" | | 1.26 | 0.35 | 0.53 | 0.28 | 0.42 |
| Broad | Min | 0.80 | 0.35 | 0.35 | 0.44 | 0.44 |
|  | Max | 1.50 | 0.50 | 0.75 | 0.33 | 0.50 |
| Intermed | Min | 1.15 | 0.35 | 0.35 | 0.30 | 0.30 |
|  | Max | 1.35 | 0.45 | 0.65 | 0.33 | 0.48 |
| Narrow | Min | 1.20 | 0.35 | 0.50 | 0.29 | 0.42 |
|  | Max | 1.30 | 0.40 | 0.55 | 0.31 | 0.42 |

Where:

c/D is the chord length of the shaft fairing divided by the rotor hub diameter. Chord length increase allows for a larger thickness, while reducing the thickness ratio t/c.

t/D-mid is the thickness of the shaft fairing at its midsection relative to the hub diameter where the minimum is 0.35 due to the rotor shaft geometry which must be contained therein. t/D-mid is preferably the minimum value and the thickness is expanded toward the ends (t/D-end) to reduce drag on the upper and lower hub fairings.

t/D-end is the thickness of the shaft fairing adjacent the upper and lower hub fairings. t/D-end is preferably greater than t/D-mid to reduce drag of the upper and lower rotor hub fairings.

t/c-mid is the thickness/chord ratio at the mid-section of the shaft fairing relative to hub diameter.

t/c-end is the thickness/chord ratio of the shaft fairing adjacent the upper and lower hub fairings. The thickness at ends reduces rotor hub drag, but t/c cannot be too high otherwise the drag on the shaft fairing will unacceptably increase.

Applicants have discovered that the incorporation of a relatively thicker shaft fairing reduces the overall total drag of the rotor hub fairing system as compared to no shaft fairing or a relatively thinner shaft fairing. This is counter intuitive as one would expect that a thinner shaft fairing would decrease overall drag since a thinner shaft fairing has less surface area. The Applicants however have determined that a thicker shaft fairing reduces overall drag due to, inter alia, interference effects with the upper and lower hub fairings 38, 40.

Through optimization of the interferences between the shaft fairing 42, the upper hub fairing 38 and the lower hub fairing 40, with modification of the contour shape and airfoil shape of the shaft fairing 42, Applicants have realized a net drag reduction of approximately 54%, relative to current fairings, and a 68% reduction relative to the unfaired "baseline" rotor hub system. Applicants have further reduced drag on the uppermost areas of the rotor system 12, i.e., the upper hub fairing 38 and the shaft fairing 42, by approximately 66%, relative to previous fairings, and about 74% relative to the "baseline" rotor hub system.

As readily understood by one of ordinary skill in the art, the rotor hub fairing system may incorporate other shapes, as well as various other aerodynamic arrangements.

Splitters and Vanes

Figure 12A:
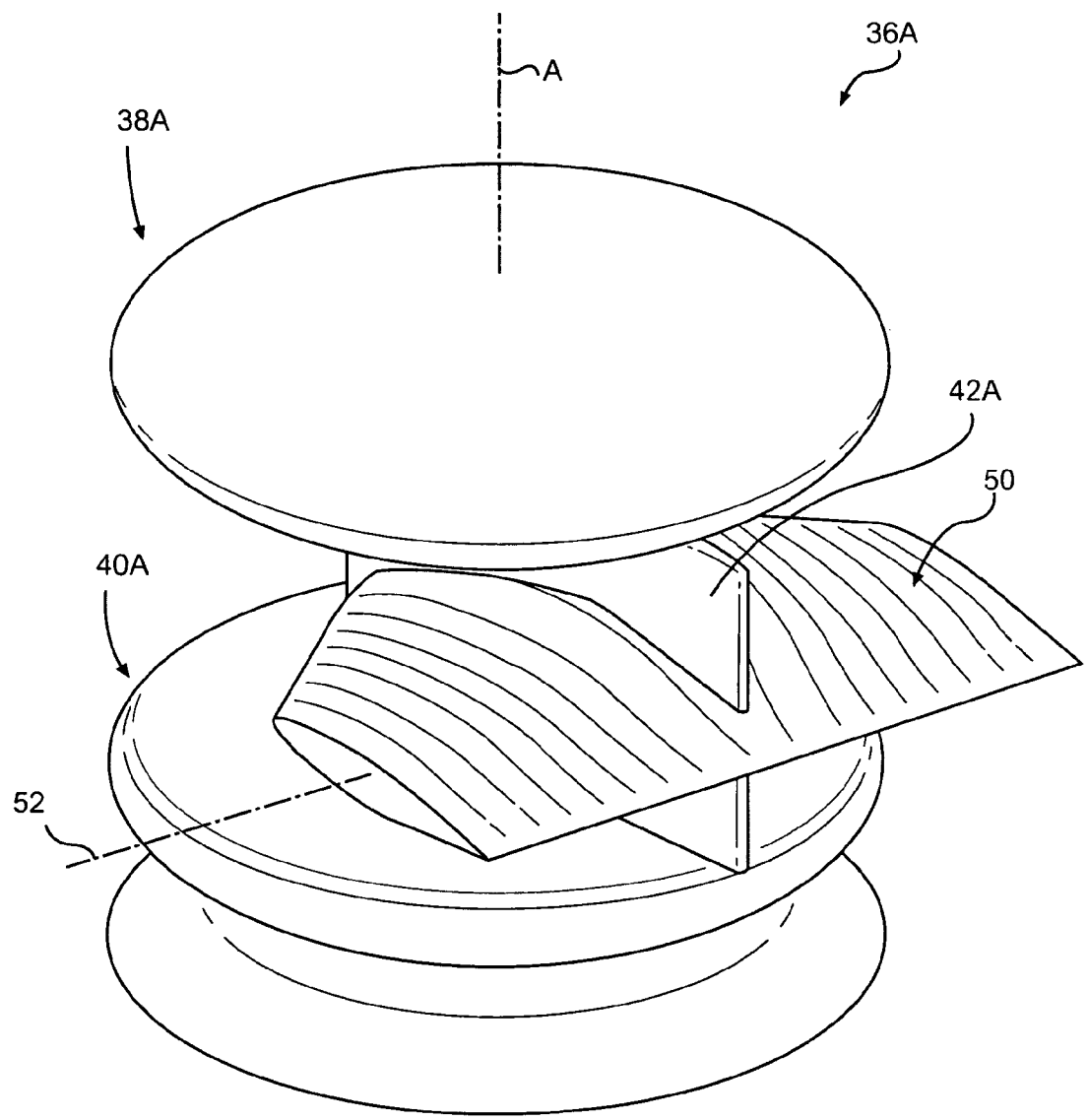
FIG. 12A is an oblique top aft perspective view of another rotor hub fairing system with a splitter airfoil.

Referring to FIG. 12A, Applicants have also discovered that additional drag reduction may be achieved by incorporating horizontal wing-like splitters airfoil 50 which extends from the shaft fairing 42A.

The splitter airfoil 50 preferably extends from the shaft fairing 42A between the upper and lower hub fairings 38A, 40A. The splitter airfoil 50 defines a pitching axis 52 which is generally transverse to the rotor axis of rotation A. It should be understood that a contoured shaft fairing midsection 46 as described with reference to FIGS. 11A-11F may additionally be utilized. Furthermore, as previous stated, the shaft fairing 42A is preferably sized with the upper hub fairing 38A and the lower hub fairing 40A to further reduce overall drag. The splitter airfoil 50 may also be made integral with the shaft fairing 42A.

Figure 12B:
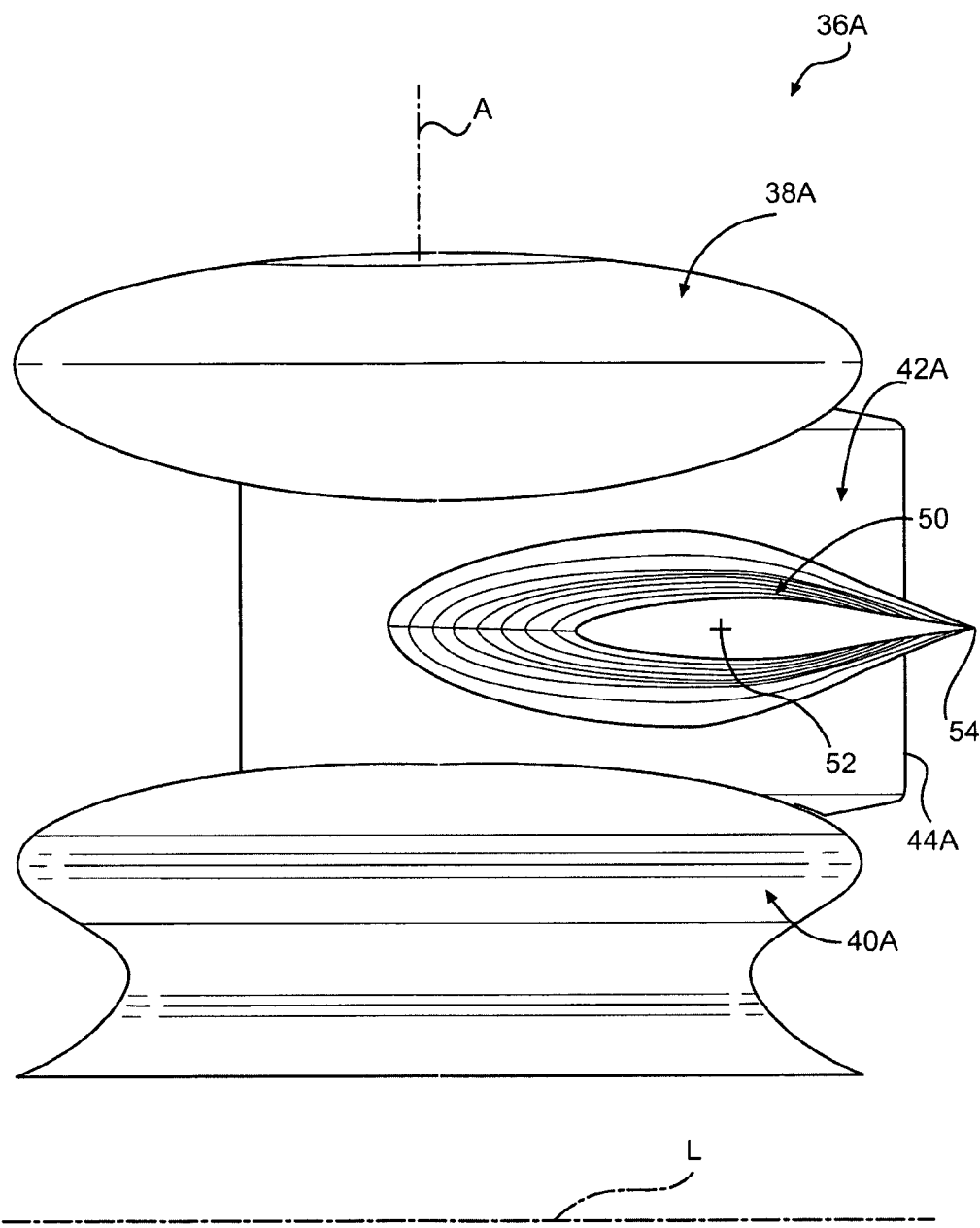
FIG. 12B is a side view of the rotor hub fairing system of FIG. 12A.

Preferably, the splitter airfoil 50 includes an airfoil profile which reduces drag and sensitivity to angle of attack variations expected to occur below the rotor hub fairing system 36A. The splitter airfoil 50 preferably defines a peak thickness near an aft periphery of the rotor hub fairings 38A, 40A (FIG. 12B). That is, the splitter airfoil 50 includes an airfoil shape that has a maximum thickness near mid-chord. The splitter airfoil 50 may also include a splitting airfoil trailing edge 54 which extends aft of a shaft fairing trailing edge 44A.

Figure 12C:
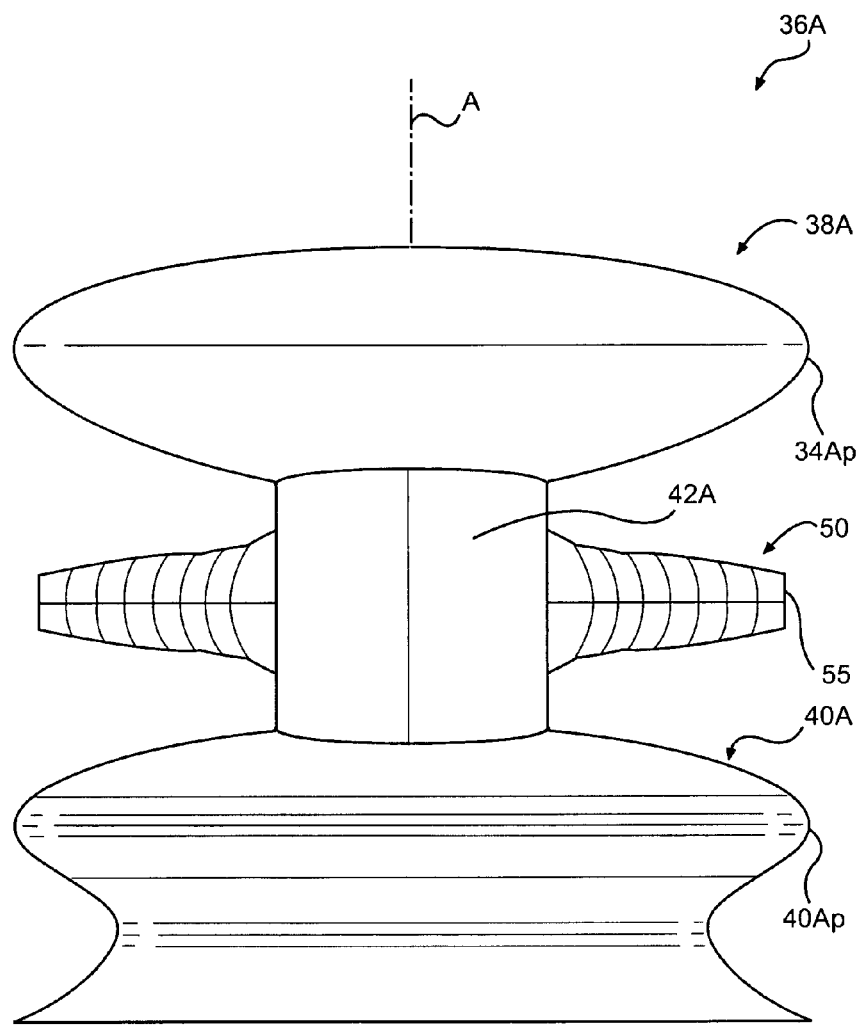
FIG. 12C is a front view of the rotor hub fairing system of FIG. 12A.
Figure 12D:
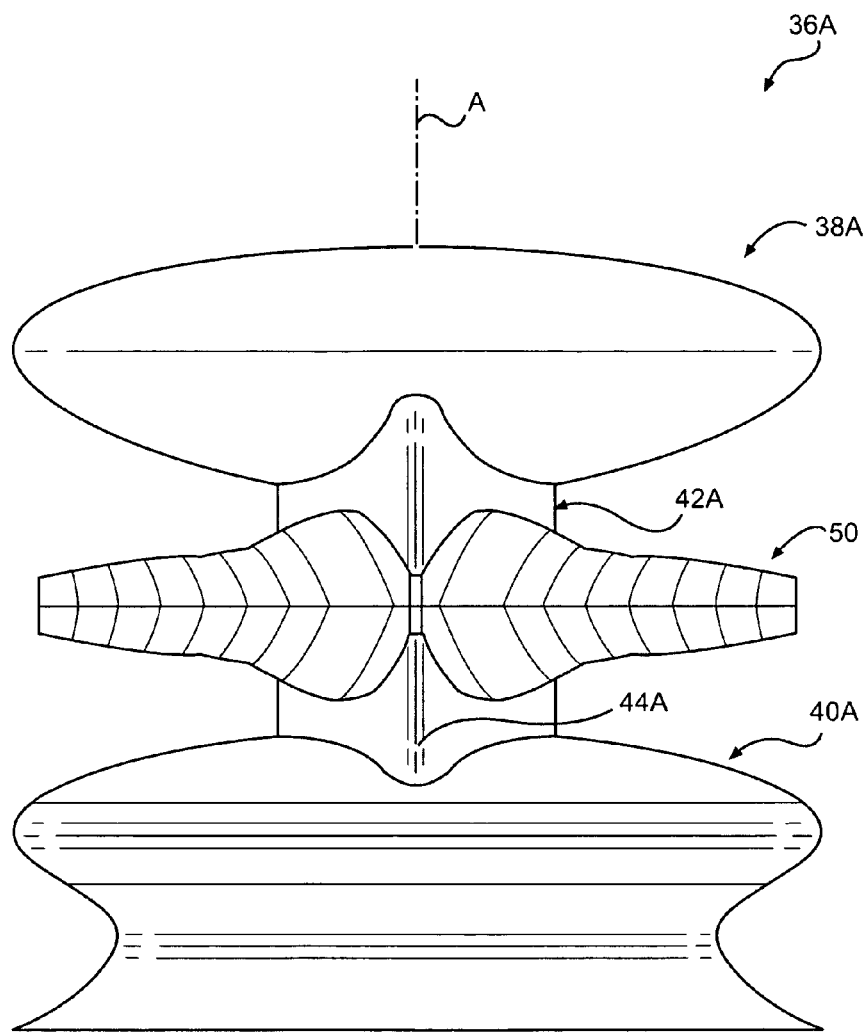
FIG. 12D is a rear view of the rotor hub fairing system of FIG. 12A.

The airfoil shape of the splitter airfoil 50 is preferably shaped relative to the upper and lower hub fairing 38A, 40A contours. The splitter airfoil 50 may also be contoured in the circumferential direction to approximate the rotor hub fairing periphery 38Ap, 40Ap (FIGS. 12C and 12D). The splitter airfoil tip ends 55 preferably align closely with the freestream relative the rotor hub fairing periphery 38Ap, 40Ap so that overall edge drag is reduced. That is, the splitter airfoil 50 does not significantly extend past the periphery 38Ap, 40Ap of the upper and lower hub fairings 38A, 40A.

The splitter airfoil 50 may be sized and configured to direct the trajectory of the wake generated by the rotor hub fairing system 36A by specifically tailoring the angle of attack of the splitter airfoil 50. The airfoil shape of the splitter airfoil 50 facilitates a fixed or adjustable angle of attack to specifically tailor the rotor hub wake in a direction that reduces the impact on the airframe 14 and tail vibration. Preferably, the splitter airfoil 50 is pitched at a predetermined angle of attack along the pitch axis 52 (FIG. 12B) relative the aircraft longitudinal axis L (FIG. 1A). Alternatively or in addition, the splitter airfoil 50 may be actively articulated about the pitch axis 52 in response to particular flight profiles.

Figure 12E:
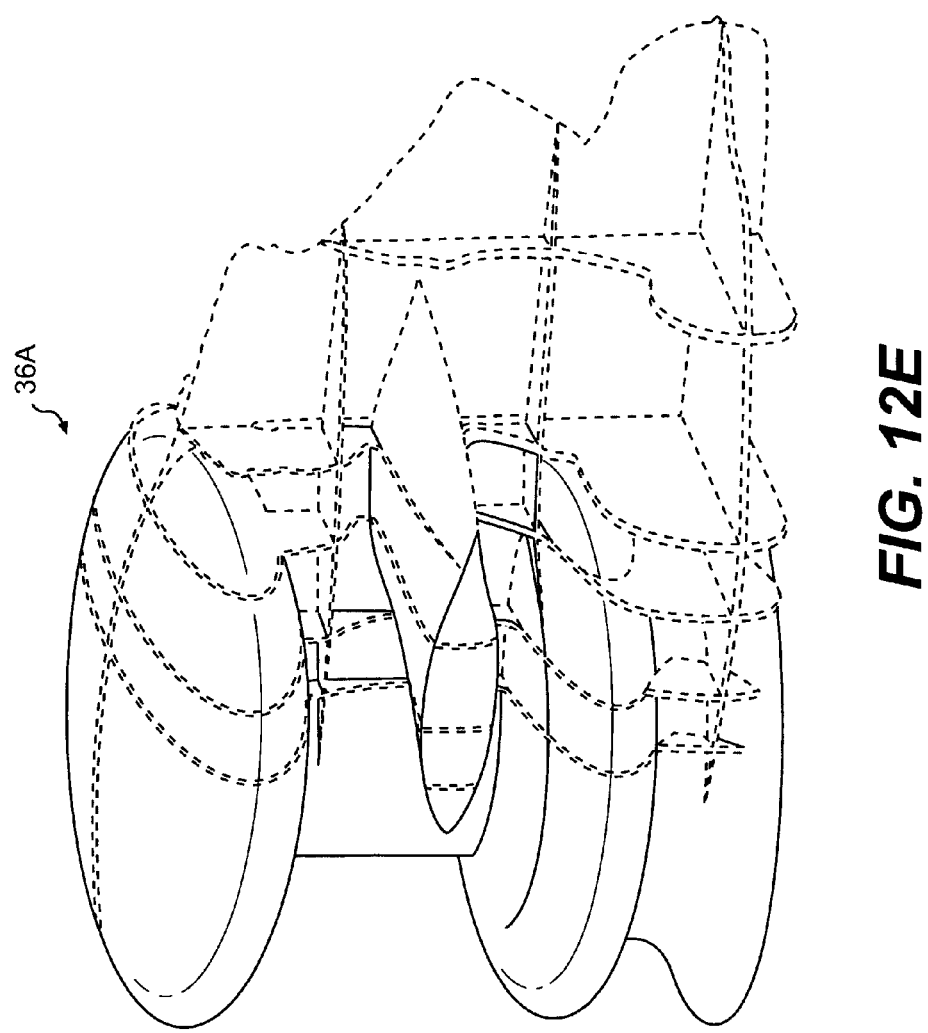
FIG. 12E is a computed total pressure contour produced by the rotor hub fairing system of FIG. 12A.

The splitter airfoil 50 reduces the effective area and increases the airflow through an aft section of the rotor hub fairing system 36A adjacent the upper hub fairing 38A and the lower hub fairing 40A to reduce flow separation. The splitter airfoil 50 also reduces the effective diffusion rate of flow which reduces the flow separation penalty on the upper and lower rotor hub fairings 38A, 40A (FIG. 12E). It should be understood that the location, size, placement and planform shape of the splitter airfoil 50 is preferably optimized to reduce separated flow on the upper and lower rotor hub fairings 38A, 40A, thus achieving improved overall drag reduction. The splitter airfoil 50 may also be used in combination with other shaft fairing designs and fillets for overall drag reduction.

Figure 12F:
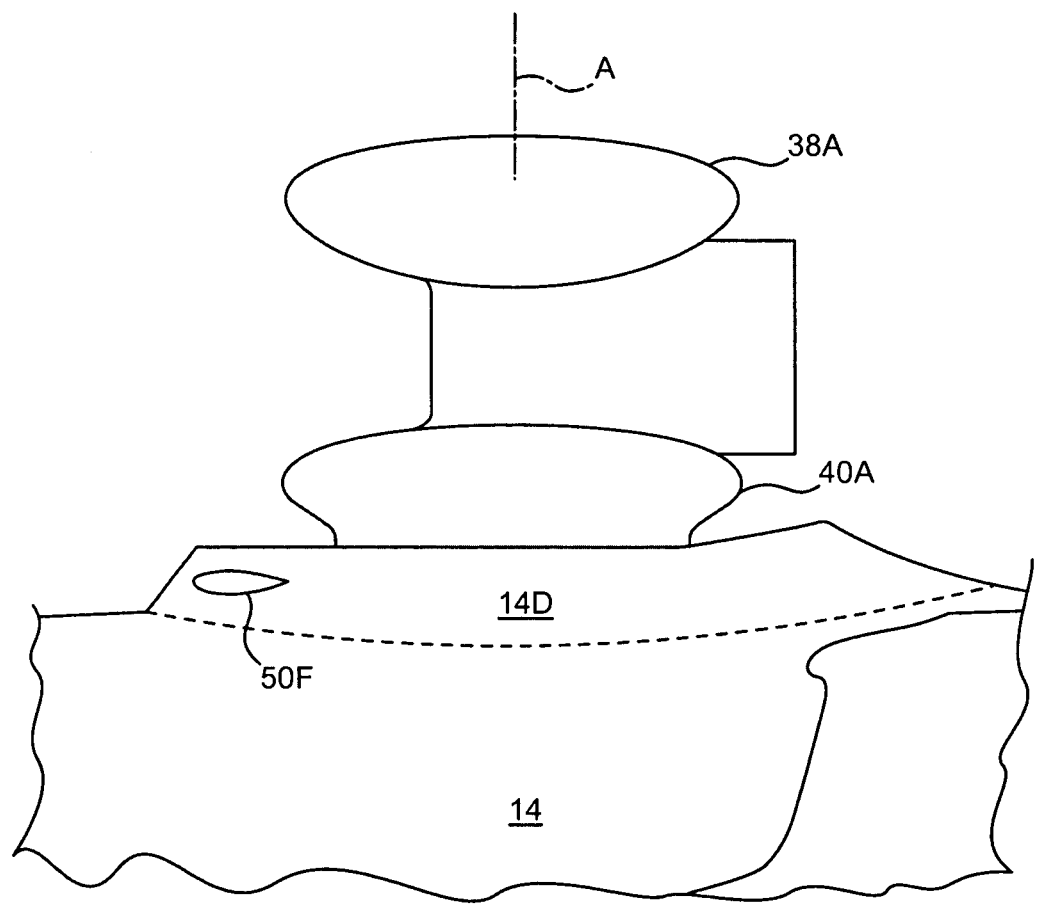
FIG. 12F is a schematic side view of a rotor hub fairing system having a complimentary fuselage mounted splitter airfoil which reduces the flow separation penalty on the rotor hub fairing system.

Referring to FIG. 12F, a splitter airfoil 50F may alternatively or additionally be mounted on the airframe 14 to provide complementary airflow direction which reduces flow separation on the upper and lower rotor hub fairings 38A, 40A. As shown, the splitter airfoil 5OF is preferably located on the airframe pylon 14D.

Figure 13A:
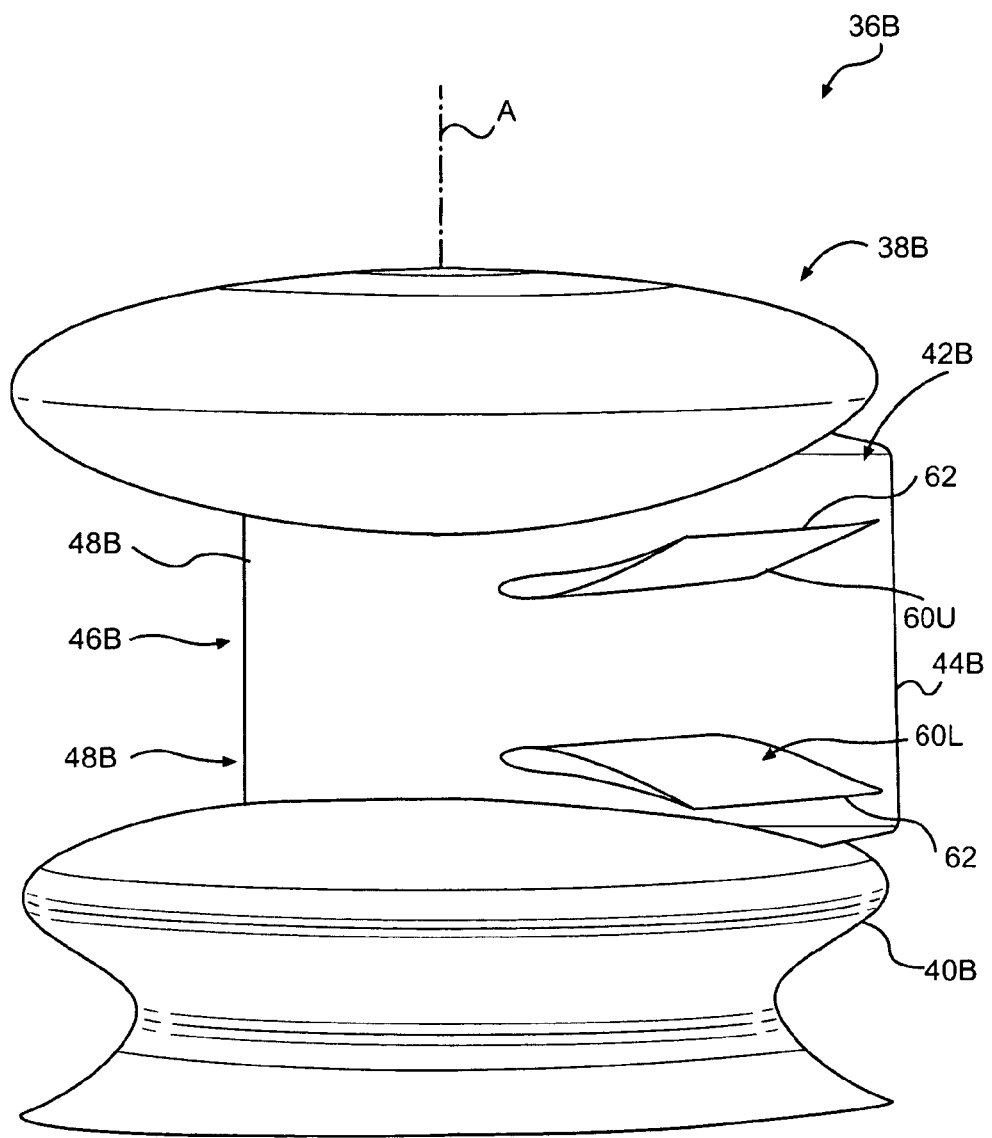
FIG. 13A is an oblique perspective view of another rotor hub fairing system with a plurality of turning vanes.

Referring to FIG. 13A, the rotor hub fairing system may alternatively or in addition include a plurality of turning vanes 60U, 60L which extend from the shaft fairing 42B adjacent a trailing edge 44B of the shaft fairing 42B. The turning vanes 60U, 60L preferably extend from the outer shaft fairing sections 48B of the shaft fairing 42B. That is, the upper turning vane 60U and the lower turning vane 60L are respectively biased toward the upper hub fairing 38B and the lower hub fairing 40B. It should be understood that although the present invention is shown and described as having both a plurality of upper turning vanes 60U and a plurality of lower turning vanes 60L, such is not necessary and the rotor hub fairing system 36B may include a single pair of upper turning vanes 60U or a single pair of lower turning vanes 60L.

The rotor hub fairing system 36B may also incorporate a contoured shaft fairing midsection 46 as described with reference to FIGS. 11A-11F. Moreover, as previous stated, the shaft fairing 4B is preferably sized with the upper hub fairing 38B and the lower hub fairing 40B to further reduce overall drag. Furthermore, the turning vanes 60U, 60L may also be formed as an integral component of the shaft fairing 42B.

Figure 13B:
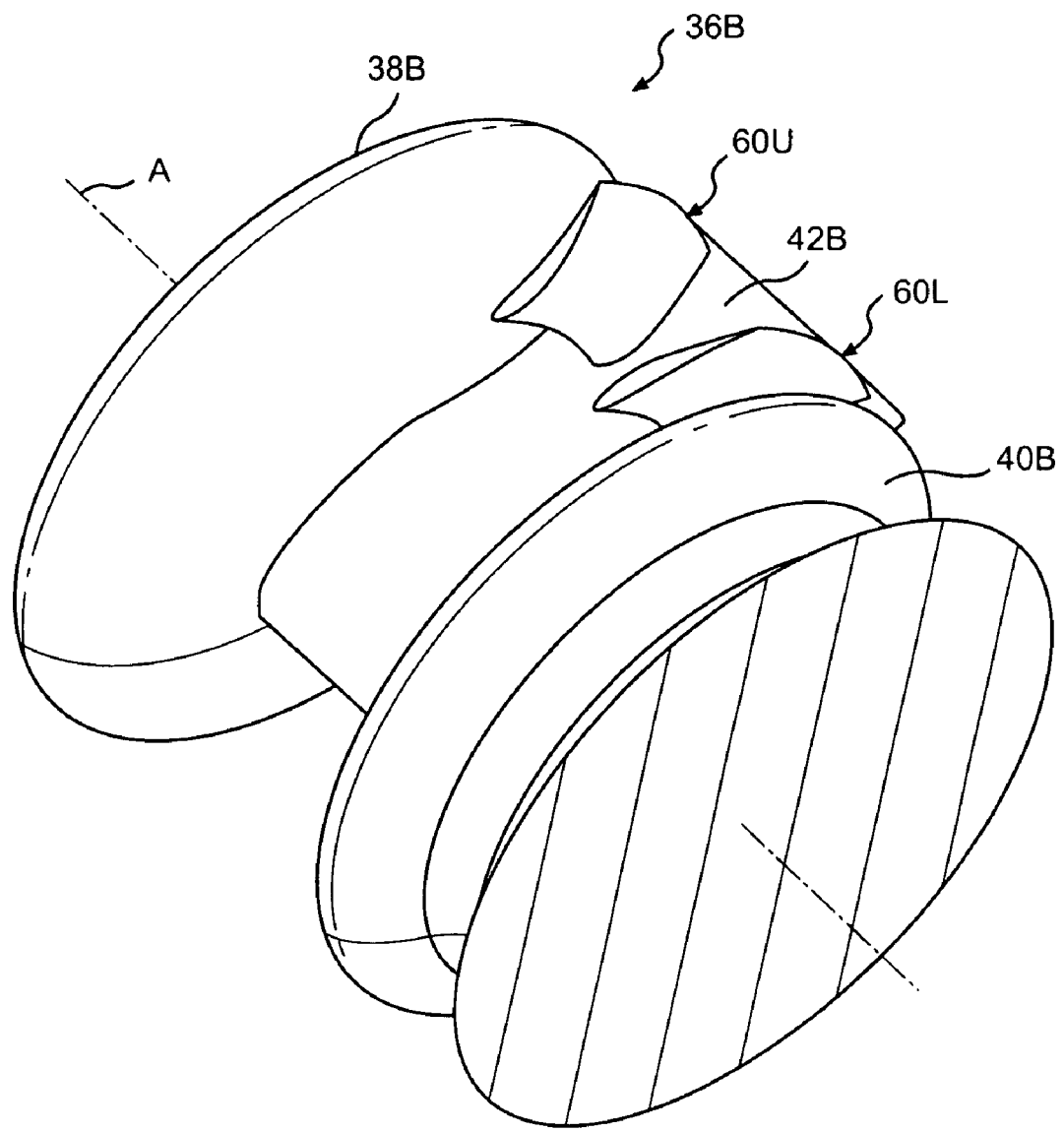
FIG. 13B is an oblique bottom perspective view of the rotor hub fairing system of FIG. 13A.
Figure 13C:
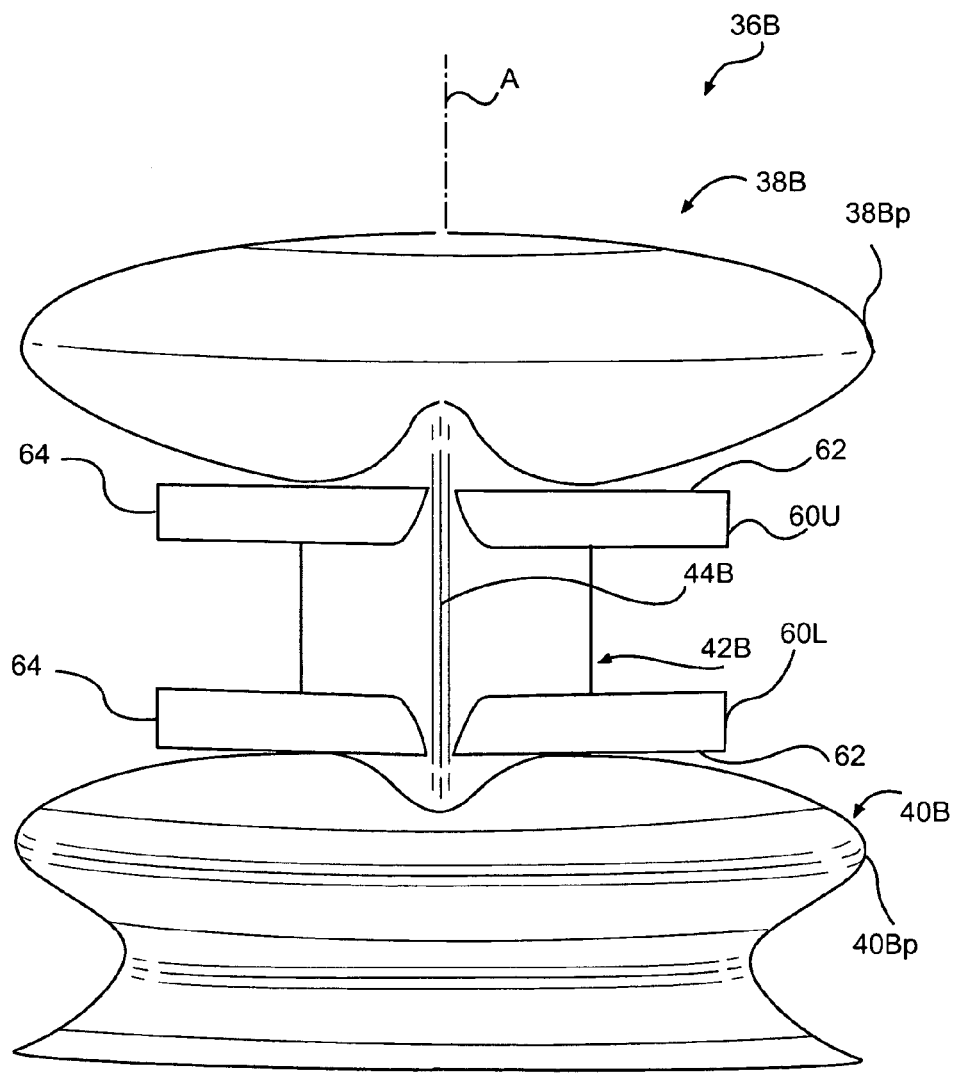
FIG. 13C is a rear perspective view of the rotor hub fairing system of FIG. 13A.
Figure 13D:
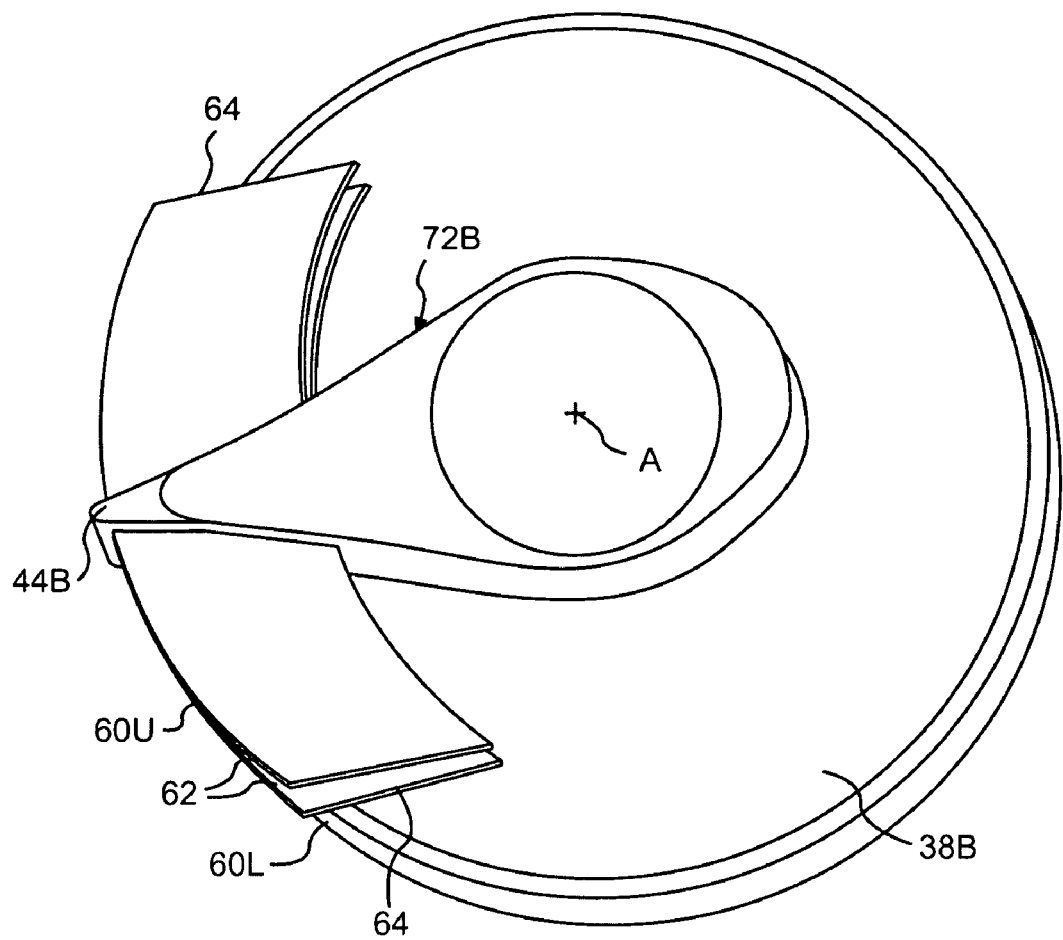
FIG. 13D is a top view of the rotor hub fairing system of FIG. 13A with the upper rotor hub fairing removed.

The turning vanes 60U, 60L are preferably shaped relative to the contours of the upper and lower hub fairings 38B, 40B. The upper turning vane 60U may be located adjacent the upper hub fairing 38B and preferably includes a camber which follows the contour of the upper hub fairing 38B while the lower turning vane 60L may be located adjacent the lower hub fairing 40B and preferably includes a camber which follows the contour of the lower hub fairing 40B (FIGS. 13B and 13C). The turning vanes 60U, 60L are also preferably contoured in the circumferential direction to approximate the circular rotor hub fairing periphery 38Bp, 40Bp (FIG. 4D) and preferably include an arcuate trailing edge 62 which follows the rotor hub fairing periphery 38Bp, 40Bp. The turning vane tip ends 64 preferably align closely with the freestream relative the rotor hub fairing outer periphery 38Bp, 40Bp (FIG. 13D) so that overall edge drag is reduced. That is, the turning vanes 60U, 60L are clipped and do not significantly extend past the periphery of the upper and lower hub fairings 38Bp, 40Bp to align the tip ends 64 parallel to a freestream airflow (FIG. 13C).

The upper and lower turning vanes 60U, 60L may be asymmetric airfoil shapes that are mirror images of each other. The turning vanes 60U, 60L are orientated such that the surface of the airfoil closest to the associated hub fairing surface approximately follows the surface on the hub fairing in a freestream airflow direction allowing for some area expansion in the direction toward the turning vane trailing edge 62. The area between the turning vanes 60U, 60L and the inner surface of the respective upper and lower hub fairings 38B, 40B gradually increases to avoid excessive diffusion and flow separation.

Figure 13E:
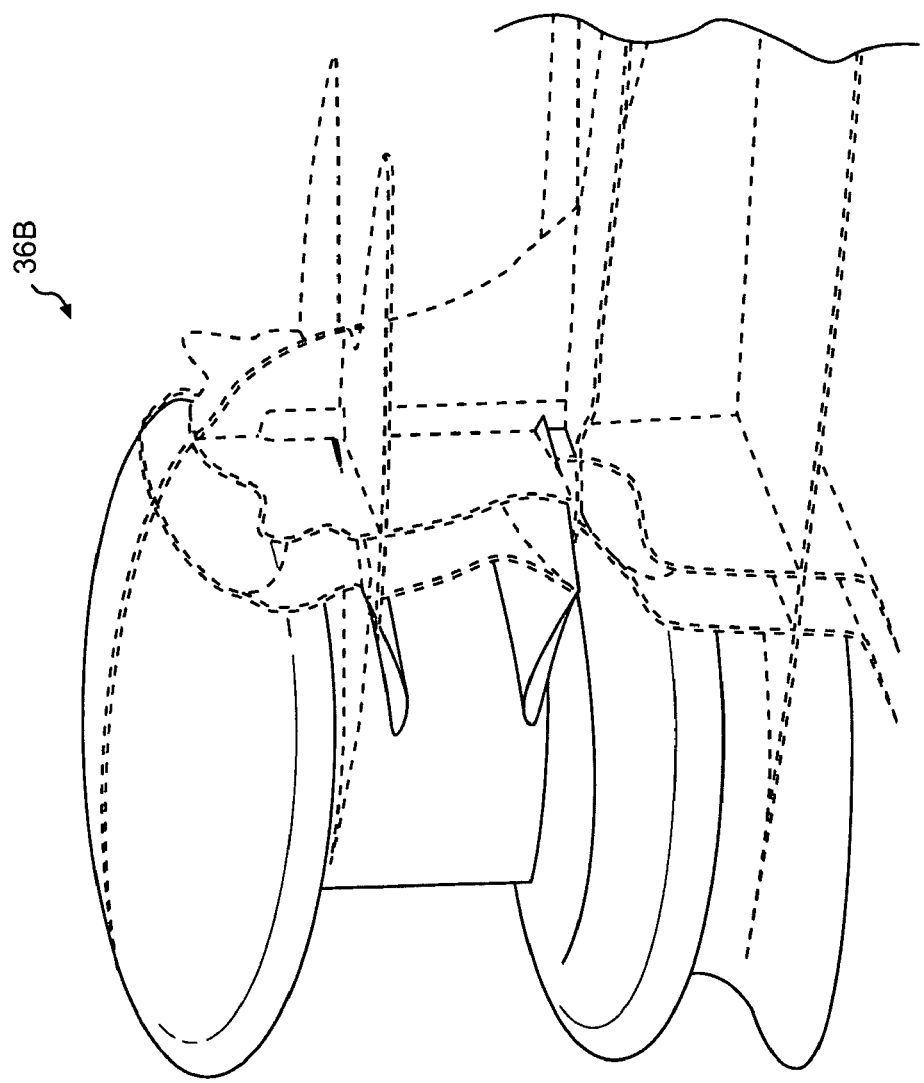
FIG. 13E is a computed total pressure contour produced by the rotor hub fairing system of FIG. 13A.

The turning vanes 60U, 60L facilitate flow around the aft area of the upper and lower hub fairings 38B, 40B (FIG. 13E) which reduces flow separation and pressure drag. Tip vortex shed from the ends of the turning vanes 60U, 60L further delay flow separation.

Figure 13F:
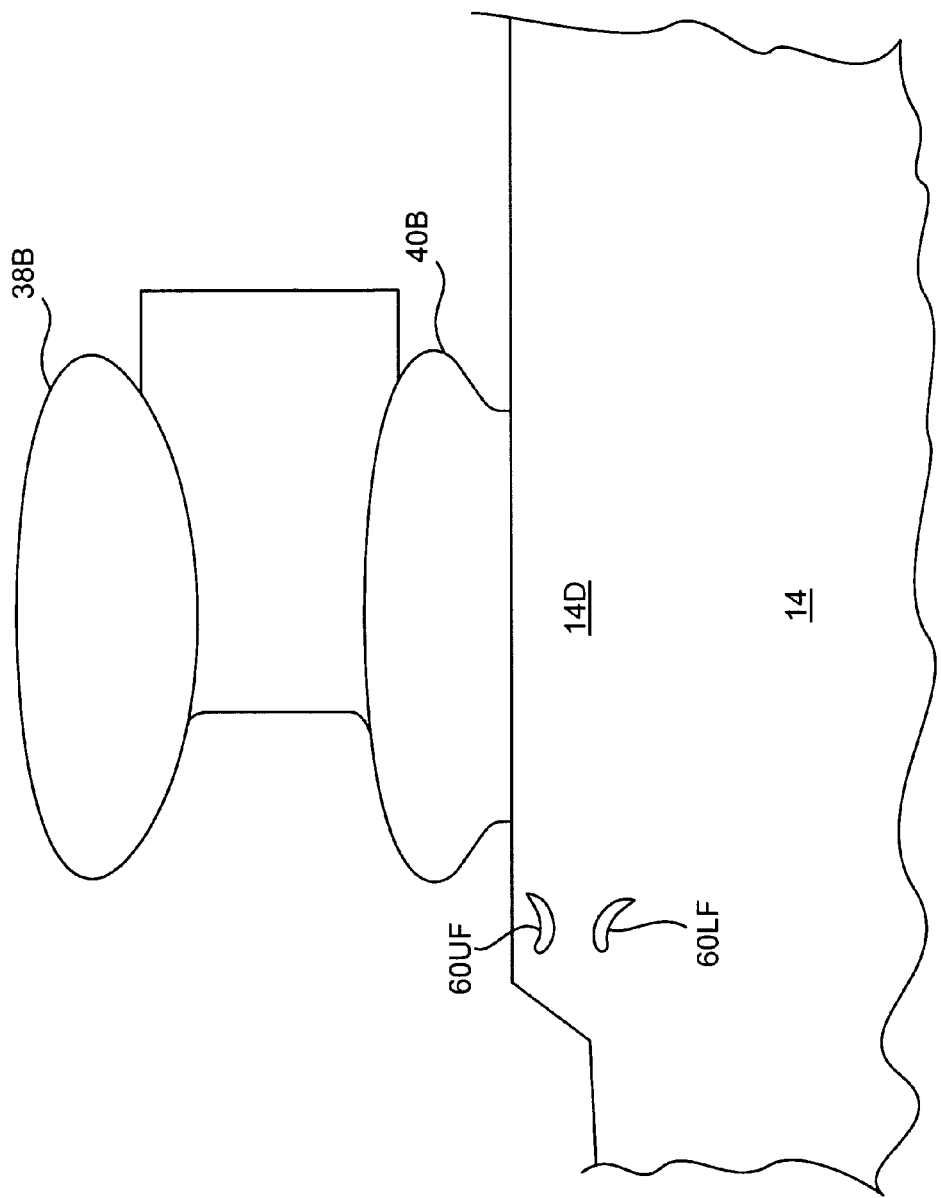
FIG. 13F is a schematic side view of a rotor hub fairing system having a complimentary fuselage mounted plurality of turning vanes which reduce the flow separation penalty on the rotor hub fairing system.

Referring to FIG. 13F, a set of turning vanes 60UF, 60LF may alternatively or additionally be mounted on the airframe 14 to provide complementary airflow direction which reduces flow separation on the upper and lower rotor hub fairings 38B, 40B. As shown, the set of turning vanes 60UF, 60LF are preferably located on the airframe pylon 14D.

Flow Control

Figure 14A:
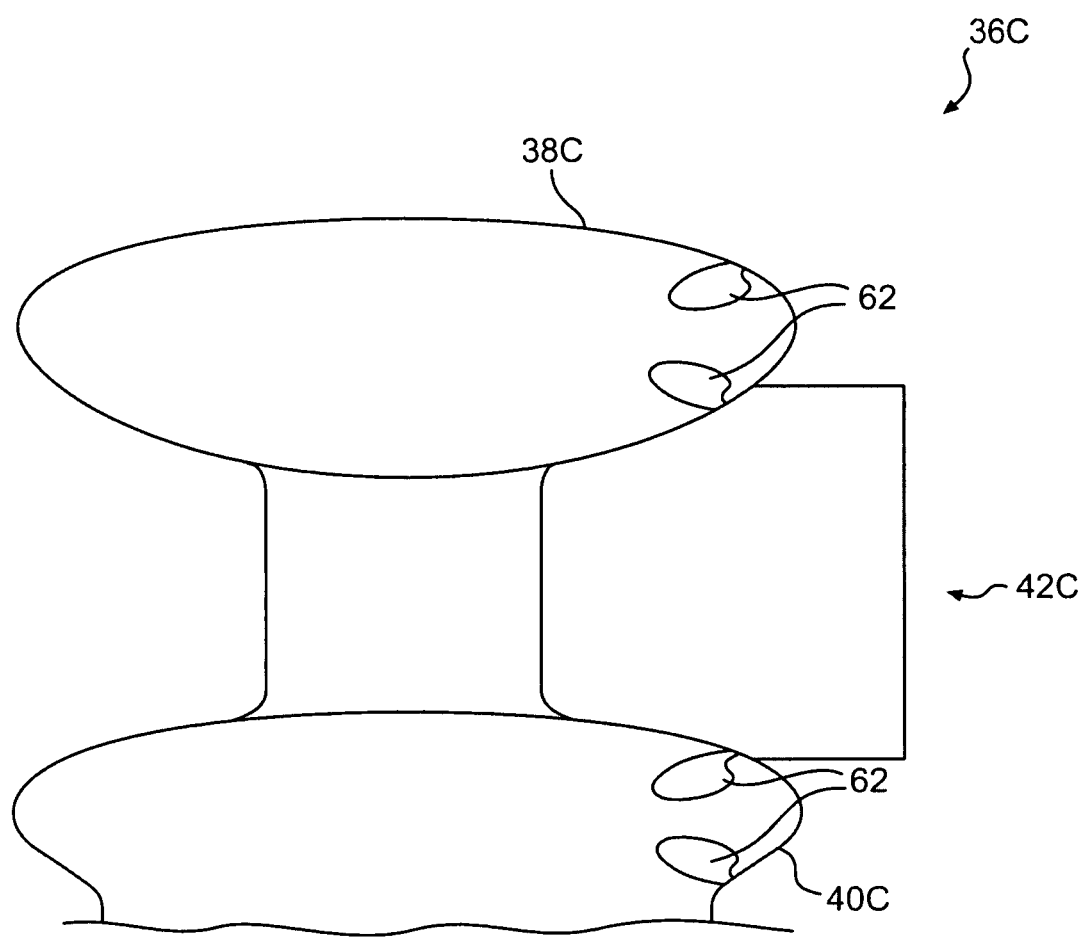
FIG. 14A is a schematic side view of another rotor hub fairing system with a plurality of directed synthetic jets mounted in each of the upper and lower rotor hub fairings.

Referring to FIG. 14A, the rotor hub fairing system 36C may alternatively or in addition include directed synthetic jets (DSJs) 62. Although the DSJ 62 may be located anywhere in or on the rotor hub fairing system 36C, preferably, as shown, the DSJ 62 are located on at least one of the upper and lower hub fairings 38C, 40C. The DSJs 62 provide complementary airflow direction to reduce the flow separation penalty on the upper and lower rotor hub fairings 38C, 40C. For further understanding of other aspects of the DSJs and associated components thereof, attention is directed to U.S. Pat. No. 6,390,418, entitled "Tangentially Directed Acoustic Jet Controlling Boundary Layer," which is assigned to the assignee of the instant invention and which is hereby incorporated herein in its entirety.

Figure 14B:
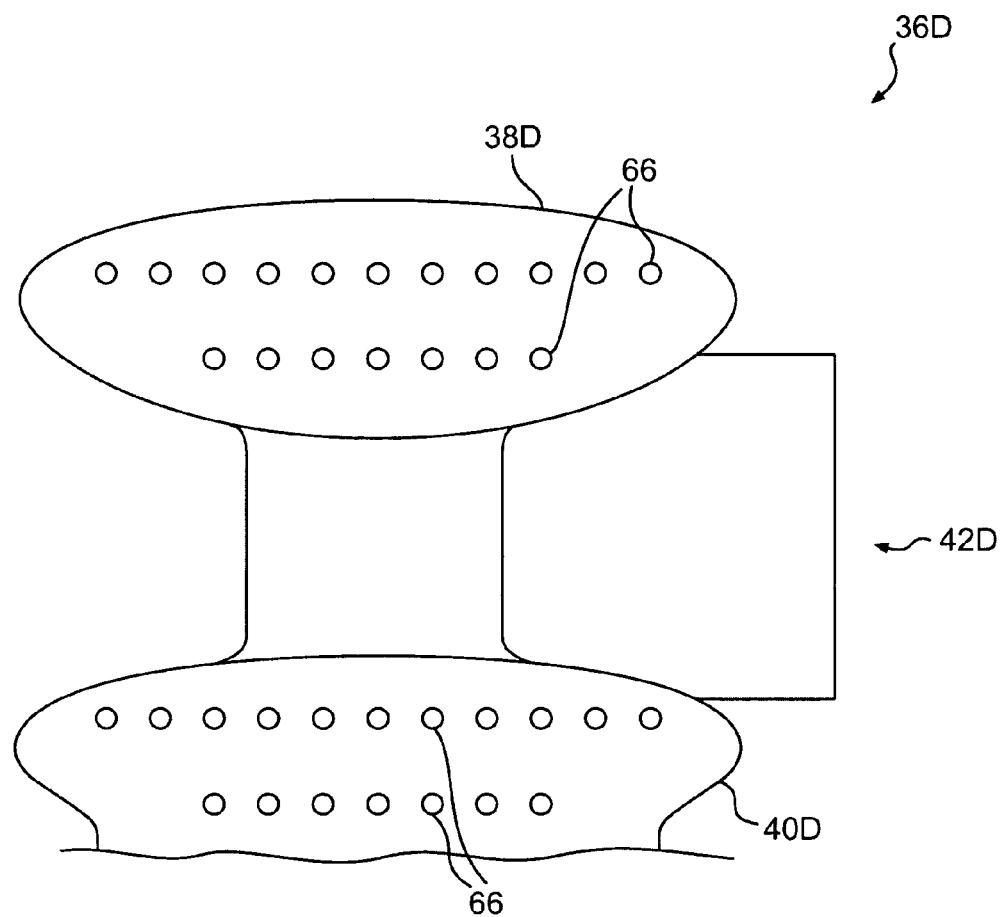
FIG. 14B is a schematic side view of another rotor hub fairing system with a plurality of centrifugal pumping openings in each of the upper and lower rotor hub fairings.

Referring to FIG. 14B, the rotor hub fairing system 36D may alternatively or in addition include centrifugal pumping openings 66 which are similar to the DSJs 62 but which provide steady blowing compared to the unsteady blowing of the DSJs. It should be further understood that rotation of the upper hub fairing 38D and the lower hub fairing 40D provide the pumping action.

Figure 14C:
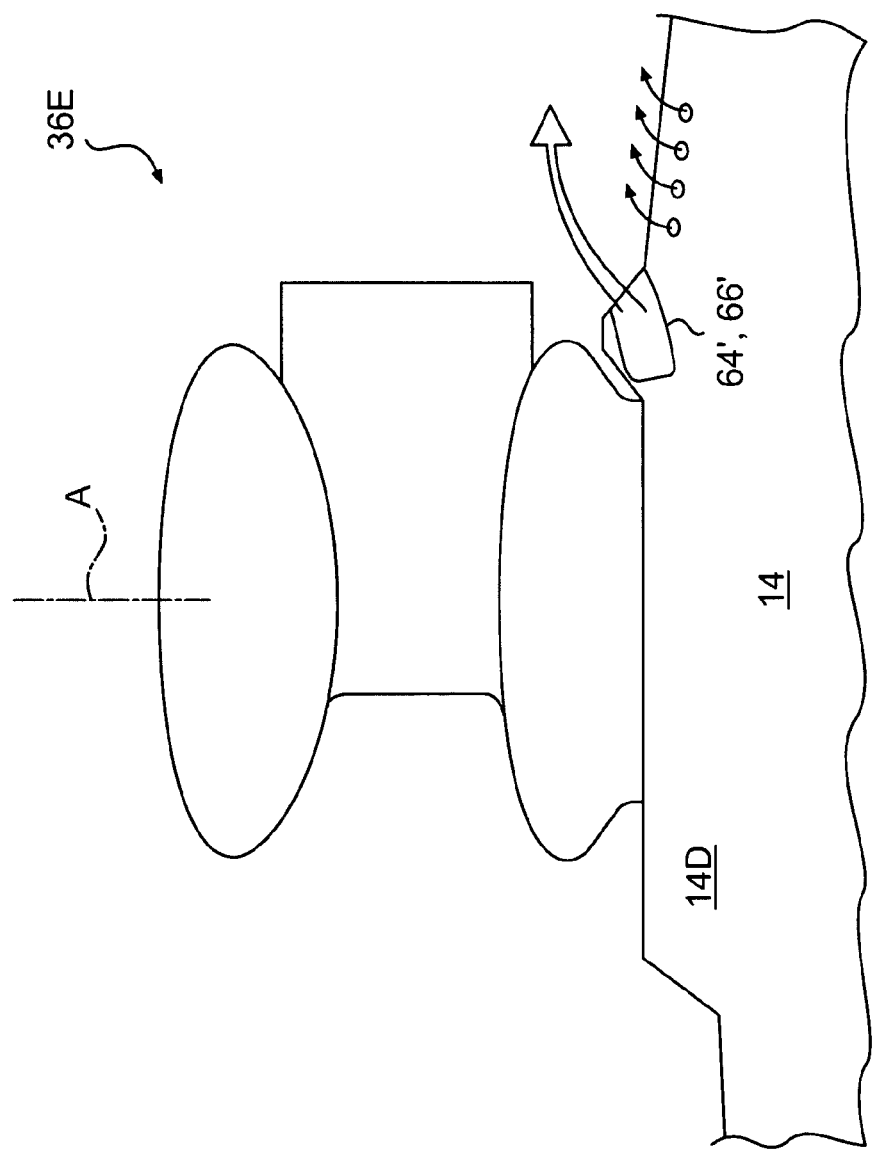
FIG. 14C is a schematic view of another rotor hub fairing system with a complimentary fuselage mounted directed synthetic jet or pumping opening which reduce the flow separation penalty on the rotor hub fairing system.

Referring to FIG. 14C, the DSJs 64' or centrifugal pumping openings 66' may alternatively or additionally be located in the airframe 14 and preferably on an aft portion of the airframe pylon 14D.

Referring to FIG. 14D, flow control may be further complimented by an airframe-located intake 68 and airframe-located exhaust 70 to provide complementary airflow direction which reduces the flow separation penalty on the rotor hub fairing system 36F. It should be understood that various intakes, exhausts, scoops and the like, as well as engine-driven and ambient flow may be usable with the present invention.

Vortex Generation

Figure 15:
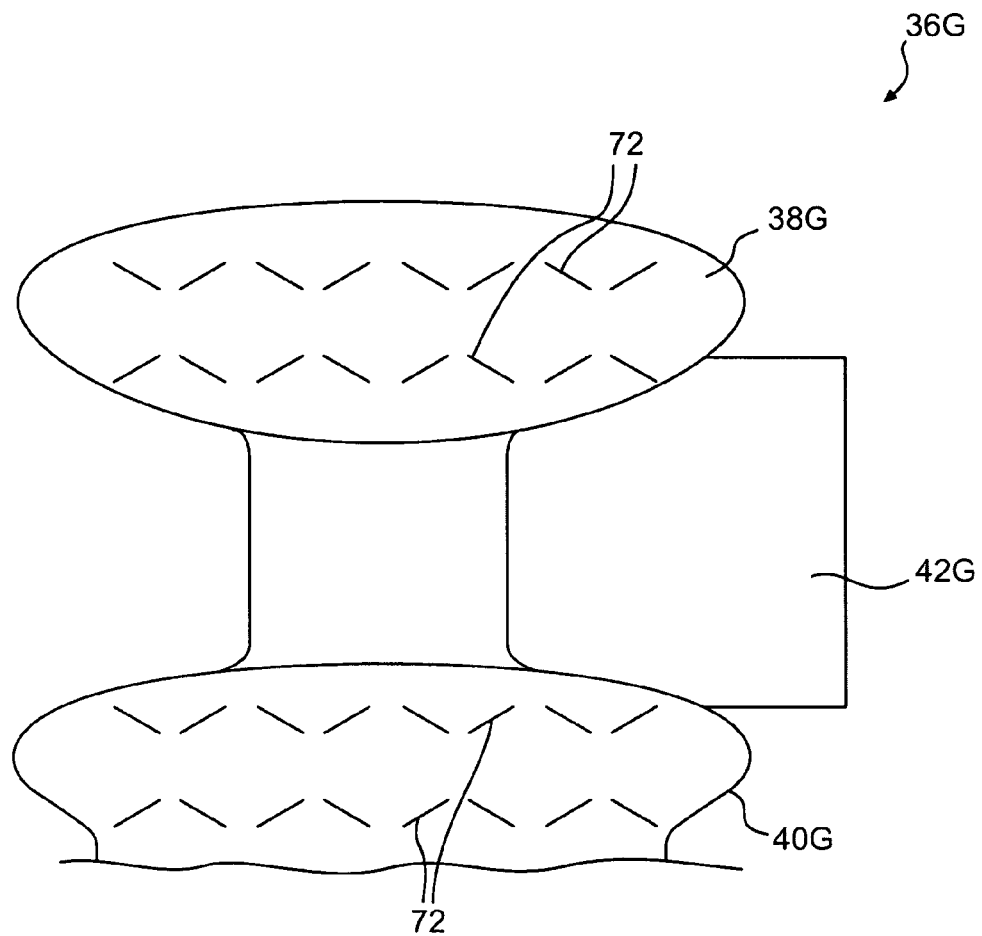
FIG. 15 is a schematic side view of another rotor hub fairing system with a plurality of vortex generators.

Referring to FIG. 15, the rotor hub fairing system 36G may alternatively or in addition include a plurality of vortex generators 72 (illustrate schematically) fixed to at least one of the upper hub fairing 38G and the lower hub fairing 40G to further reduce the flow separation penalty on the upper and lower rotor hub fairings 38G, 40G.

Flow Redirection

Figure 16B:
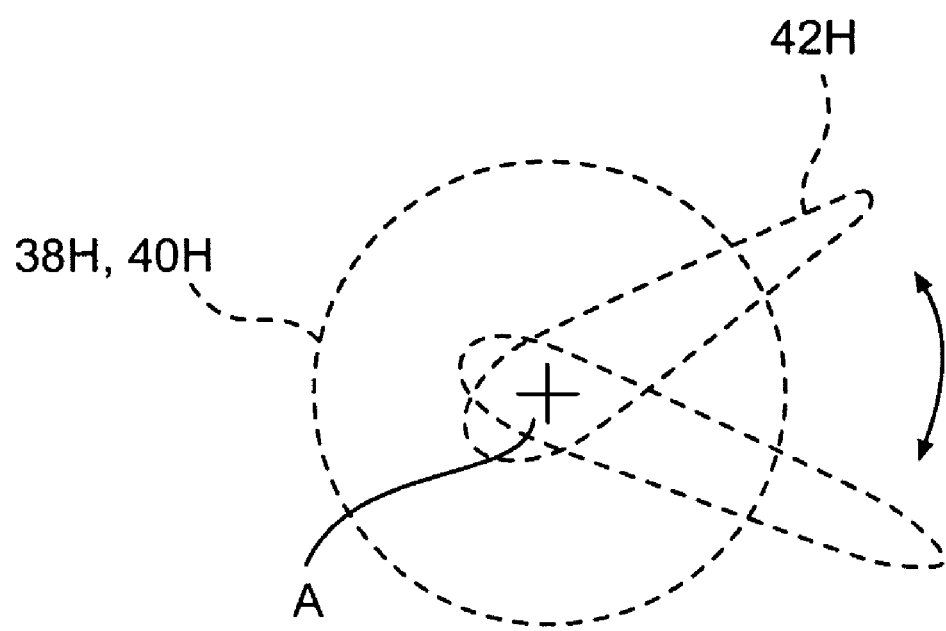
FIG. 16B is a top schematic view illustrating one control scheme for the active shaft fairing of FIG. 16A.

Referring to FIG. 16A, the rotor hub fairing system 36H may alternatively or in addition include a driven shaft fairing 42H which is preferably driven about the axis of rotation A in response to a control system (illustrated schematically) to further reduce the flow separation penalty on the upper and lower rotor hub fairings 38H, 40H. It should be understood that various drive systems D such as a gear system powered by rotation of the rotor system 12 may be utilized to drive the shaft fairing 42G. Since the rotor system 12 is a counter-rotating coaxial rotor system, rotation from either shaft 12L, 12U may be selectively tapped to drive the shaft fairing 42H in response to the control system. In one control scheme the shaft fairing 42H is oscillated about the axis of rotation A (FIG. 16B) to minimize the flow separation penalty. It should be understood that various control surface on or adjacent the shaft fairing 42H will also benefit from the present invention.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention. For example, while various descriptions of the present invention are described above, it should be understood that the various components/features can be used singly or in any combination thereof. Therefore, this invention is not to be limited to the specific preferred embodiments/arrangements depicted herein.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A rotor hub fairing system for a counter rotating coaxial rotor system comprising:
    an upper hub fairing defined about an axis;
    a lower hub fairing defined about said axis; and
    an airfoil-shaped shaft fairing between said upper hub fairing and said lower hub fairing, said airfoil-shaped shaft fairing contoured to reduce a total drag of the rotor hub fairing system, said shaft fairing defines a thickness to hub fairing diameter (t/D) greater than 0.35.

2. The rotor hub fairing system as recited in claim 1, wherein said shaft fairing is generally of an hour glass shape in cross-section taken within a contoured midsection along said axis and transverse to said airfoil.

3. The rotor hub fairing system as recited in claim 2, wherein said t/D is taken at a minimum of said contoured midsection.

4. The rotor hub fairing system as recited in claim 2, wherein said shaft fairing includes a NACA 0028 airfoil along said midsection and an NACA 0042 airfoil adjacent said upper hub fairing and said lower hub fairing.

5. The rotor hub fairing system as recited in claim 1, wherein said shaft fairing defines a trailing edge which extends beyond a periphery of said upper hub fairing and said lower hub fairing.

6. The rotor hub fairing system as recited in claim 1, wherein said shaft fairing defines a chord length divided by said rotor hub diameter (c/D) between 0.8 and 1.5.

7. The rotor hub fairing system as recited in claim 1, further comprising at least one airfoil member which extends generally transverse to said shaft fairing.

8. The rotor hub fairing system as recited in claim 7, wherein said at least one airfoil member includes an upper turning vane and a lower turning vane on each side of said shaft fairing.

9. A rotor hub fairing system for a counter rotating coaxial rotor system comprising:
    an upper hub fairing defined about an axis;
    a lower hub fairing defined about said axis;
    an airfoil-shaped shaft fairing between said upper hub fairing and said lower hub fairing, said airfoil-shaped shaft fairing contoured to reduce a total drag of the rotor hub fairing system; and
    a vortex generator mounted on at least one of said upper hub fairing and said lower hub fairing.

10. A rotor hub fairing system for a counter rotating coaxial rotor system comprising:
    an upper hub fairing defined about an axis;
    a lower hub fairing defined about said axis;
    an airfoil-shaped shaft fairing between said upper hub fairing and said lower hub fairing, said airfoil-shaped shaft fairing contoured to reduce a total drag of the rotor hub fairing system; and
    a directed synthetic jet mounted on at least one of said upper hub fairing and said lower hub fairing.

11. A rotor hub fairing system for a counter rotating coaxial rotor system comprising:
    an upper hub fairing defined about an axis;
    a lower hub fairing defined about said axis;
    an airfoil-shaped shaft fairing between said upper hub fairing and said lower hub fairing, said airfoil-shaped shaft fairing contoured to reduce a total drag of the rotor hub fairing system; and
    a centrifugal pumping system mounted on at least one of said upper hub fairing and said lower hub fairing.

12. A rotor hub fairing system for a counter rotating coaxial rotor system comprising:
    an upper hub fairing defined about an axis;
    a lower hub fairing defined about said axis;
    an airfoil-shaped shaft fairing between said upper hub fairing and said lower hub fairing, said airfoil-shaped shaft fairing contoured to reduce a total drag of the rotor hub fairing system; and
    a drive system which operates to independently move said shaft fairing in response to a control system.

13. A rotor hub fairing system for a counter rotating coaxial rotor system comprising:
    an upper hub fairing defined about an axis;
    a lower hub fairing defined about said axis; and
    an airfoil-shaped shaft fairing between said upper hub fairing and said lower hub fairing, said shaft fairing defining a thickness to hub fairing diameter (t/D) greater than 0.35.

14. The rotor hub fairing system as recited in claim 12, wherein said shaft fairing defines a chord length divided by said rotor hub diameter (c/D), greater than 0.8.

15. A coaxial rotor system aircraft comprising:
    an airframe having a rotor system pylon;
    an upper hub fairing defined about an axis;
    a lower hub fairing defined about said axis, said lower hub fairing adjacent said pylon; and an airfoil-shaped shaft fairing between said upper hub fairing and said lower hub fairing, said airfoil-shaped shaft fairing contoured to reduce a total drag of the rotor hub fairing system.

16. The aircraft as recited in claim 15, wherein said airfoil-shaped shaft fairing defines a thickness to hub fairing diameter (t/D) greater than 0.35.

17. The aircraft as recited in claim 15, wherein said airfoil-shaped shaft fairing defines a chord length divided by said rotor hub diameter (c/D) greater than 0.8.

18. The aircraft as recited in claim 15, further comprising at least one airfoil member which extends from said pylon to reduce a flow separation penalty on at least one of said upper and lower rotor hub fairings.

19. The aircraft as recited in claim 15, further comprising a directed synthetic jet mounted to said pylon to reduce a flow separation penalty on at least one of said upper and lower rotor hub fairings.

20. The aircraft as recited in claim 15, further comprising an airframe-located intake to reduce a directed synthetic jet mounted to said pylon to reduce a flow separation penalty on at least one of said upper and lower rotor hub fairings.

21. The aircraft as recited in claim 15, further comprising an airframe-located exhaust to reduce a directed synthetic jet mounted to said pylon to reduce a flow separation penalty on at least one of said upper and lower rotor hub fairings.

22. The aircraft as recited in claim 15, further comprising a centrifugal pumping system mounted to said pylon to reduce a flow separation penalty on at least one of said upper and lower rotor hub fairings.

23. The aircraft as recited in claim 15, wherein said shaft fairing includes a pitching axis which extends through said upper hub fairing and said lower hub fairing, said pitching axis including an axis of rotation of the coaxial rotor system, said pitching axis is generally parallel to said axis.

* * * * *

UNITED STATES PATENT AND TRADEMARK OFFICE
CERTIFICATE OF CORRECTION

| | |
|---|---|
| PATENT NO. | : 7,530,787 B2 |
| APPLICATION NO. | : 11/436362 |
| DATED | : May 12, 2009 |
| INVENTOR(S) | : Bertolotti et al. |

It is certified that error appears in the above-identified patent and that said Letters Patent is hereby corrected as shown below:

Claim 15, Column 15, Lines 3-4: Delete "hub fairing"

Signed and Sealed this

Fourth Day of August, 2009

JOHN DOLL
*Acting Director of the United States Patent and Trademark Office*